United States Patent
Sato et al.

(10) Patent No.: US 11,394,759 B2
(45) Date of Patent: Jul. 19, 2022

(54) COMMUNICATION SYSTEM AND CONTROL APPARATUS

(71) Applicant: SONY CORPORATION, Tokyo (JP)

(72) Inventors: Hiroki Sato, Kanagawa (JP); Kensaku Wakuda, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 44 days.

(21) Appl. No.: 16/625,169

(22) PCT Filed: Jun. 15, 2018

(86) PCT No.: PCT/JP2018/022860
§ 371 (c)(1),
(2) Date: Dec. 20, 2019

(87) PCT Pub. No.: WO2019/003955
PCT Pub. Date: Jan. 3, 2019

(65) Prior Publication Data
US 2021/0144186 A1 May 13, 2021

(30) Foreign Application Priority Data
Jun. 29, 2017 (JP) .............................. JP2017-127552

(51) Int. Cl.
*G06F 15/16* (2006.01)
*H04L 65/61* (2022.01)
(Continued)

(52) U.S. Cl.
CPC ........ *H04L 65/4069* (2013.01); *H04L 65/608* (2013.01); *H04L 69/16* (2013.01)

(58) Field of Classification Search
CPC .... H04L 65/4069; H04L 69/16; H04L 65/608
(Continued)

(56) References Cited

U.S. PATENT DOCUMENTS 6,076,114 A * 6/2000 Wesley ................... H04L 29/06
370/230
7,783,775 B2 * 8/2010 Kim ................... H04N 21/6587
709/227
(Continued)

FOREIGN PATENT DOCUMENTS

JP 2013-528984 A 7/2013

OTHER PUBLICATIONS

International Search Report dated Sep. 11, 2018 in PCT/JP2018/022860, citing document AO therein, 1 page.

*Primary Examiner* — Anthony Mejia
(74) *Attorney, Agent, or Firm* — Oblon, McClelland, Maier & Neustadt, L.L.P.

(57) ABSTRACT

The present technology relates to a communication system and a control apparatus that enable to properly find out a state of a network in which streaming is performed.
A transmission apparatus performs streaming to a reception apparatus, and a control apparatus manages the state of a network that connects the reception apparatus and the transmission apparatus and includes a first communication line and a second communication line. The first communication line is unstable in connection state as compared with the second communication line, and the control apparatus manages the state of the network on the basis of a packet transmitted from the transmission apparatus to the reception apparatus. The present technology can be applied to a communication system that performs streaming by UDP.

15 Claims, 23 Drawing Sheets

(51) Int. Cl.
  *H04L 65/65* (2022.01)
  *H04L 69/16* (2022.01)
(58) Field of Classification Search
  USPC .......................................................... 709/231
  See application file for complete search history.

(56) References Cited

U.S. PATENT DOCUMENTS

| | | | | |
|---|---|---|---|---|
| 7,984,179 B1* | 7/2011 | Huang | ............... | H04N 21/6373 |
| | | | | 709/233 |
| 8,364,812 B2* | 1/2013 | Loach | ................... | H04L 69/163 |
| | | | | 709/224 |
| 9,137,026 B1* | 9/2015 | Sun | ................... | H04W 36/0011 |
| 10,187,441 B2* | 1/2019 | Martell | ............ | H04N 21/43615 |
| 2005/0021830 A1* | 1/2005 | Urzaiz | ..................... | H04L 47/10 |
| | | | | 709/233 |
| 2006/0056510 A1* | 3/2006 | Van Der Schaar | .. | H04N 19/517 |
| | | | | 375/240.12 |
| 2008/0002669 A1* | 1/2008 | O'Brien | .................. | H04L 12/66 |
| | | | | 370/352 |
| 2009/0106357 A1* | 4/2009 | Igelman | ................ | H04L 65/608 |
| | | | | 709/203 |
| 2010/0067430 A1* | 3/2010 | Shinozaki | ............. | H04L 47/283 |
| | | | | 370/315 |
| 2010/0306813 A1* | 12/2010 | Perry | ...................... | A63F 13/77 |
| | | | | 725/114 |
| 2011/0082946 A1* | 4/2011 | Gopalakrishnan | ........................... | |
| | | | | H04N 21/8456 |
| | | | | 709/231 |
| 2011/0296006 A1* | 12/2011 | Krishnaswamy | ....... | H04L 69/14 |
| | | | | 709/227 |
| 2012/0047230 A1* | 2/2012 | Begen | ................ | H04L 65/4092 |
| | | | | 709/219 |
| 2012/0173753 A1* | 7/2012 | Moorthy | ............ | H04N 21/6125 |
| | | | | 709/231 |
| 2012/0254457 A1* | 10/2012 | Condon | .............. | H04L 65/4084 |
| | | | | 709/231 |
| 2012/0290739 A1* | 11/2012 | Melnyk | ............... | H04L 47/2416 |
| | | | | 709/231 |
| 2013/0031217 A1* | 1/2013 | Rajapakse | ........... | H04L 43/0829 |
| | | | | 709/219 |
| 2013/0067109 A1* | 3/2013 | Dong | ..................... | H04L 43/08 |
| | | | | 709/231 |
| 2013/0329050 A1* | 12/2013 | Pham | .................. | H04N 21/4126 |
| | | | | 348/159 |
| 2014/0040495 A1* | 2/2014 | Vishwanath | .......... | H04L 65/602 |
| | | | | 709/231 |
| 2014/0344469 A1* | 11/2014 | Nicholls | ............... | H04L 65/602 |
| | | | | 709/231 |
| 2014/0365678 A1* | 12/2014 | Herrfurt | ................ | H04L 65/604 |
| | | | | 709/231 |
| 2015/0134771 A1* | 5/2015 | Kalman | .............. | H04L 65/4069 |
| | | | | 709/217 |
| 2015/0163273 A1* | 6/2015 | Radcliffe | .............. | H04L 65/605 |
| | | | | 709/231 |
| 2015/0195746 A1* | 7/2015 | Franklin | ............. | H04L 65/4069 |
| | | | | 370/230 |
| 2016/0021157 A1* | 1/2016 | Duerring | ............. | H04L 65/4069 |
| | | | | 709/231 |
| 2016/0073137 A1* | 3/2016 | Dewa | ................ | H04N 21/4622 |
| | | | | 725/116 |
| 2016/0156688 A1* | 6/2016 | Gouache | ............... | H04L 67/322 |
| | | | | 709/219 |
| 2016/0295250 A1* | 10/2016 | Yang | ............... | H04N 21/234363 |
| 2016/0381606 A1* | 12/2016 | Lou | ................... | H04W 36/0066 |
| | | | | 370/331 |
| 2017/0324635 A1* | 11/2017 | Oshiba | ................ | H04L 43/0882 |
| 2017/0324797 A1* | 11/2017 | Lee | ...................... | H04L 65/602 |
| 2018/0131535 A1* | 5/2018 | Johan | .................. | H04L 65/4084 |
| 2018/0323899 A1* | 11/2018 | Choi | ..................... | H04L 65/608 |
| 2018/0375915 A1* | 12/2018 | Sridhar | ................... | H04L 47/38 |
| 2019/0068327 A1* | 2/2019 | Ho | ........................ | H04L 1/0071 |
| 2019/0082348 A1* | 3/2019 | Kim | .................. | H04W 36/0022 |
| 2019/0098067 A1* | 3/2019 | Sandoval | ............ | H04L 65/4084 |
| 2019/0342159 A1* | 11/2019 | Witko | ................ | H04L 41/0806 |
| 2020/0274909 A1* | 8/2020 | Kim | ...................... | H04L 69/16 |
| 2020/0359095 A1* | 11/2020 | Ziskind | ................ | H04L 65/608 |

\* cited by examiner

COMMUNICATION SYSTEM AND CONTROL APPARATUS

TECHNICAL FIELD

The present technology relates to a communication system and a control apparatus, and more particularly, to a communication system and a control apparatus that enable to find out a state of a network in which streaming is performed.

BACKGROUND ART

Conventionally, there are diverse communication systems using a wireless communication path.

For example, Patent Document 1 discloses a system that performs communication by using a plurality of different wireless communication paths and supplementing a shortage of bandwidth in one wireless communication path with another wireless communication path.

Furthermore, in recent years, many video distribution systems that distribute moving images being captured in real time by wireless communication have been put into practical use.

CITATION LIST

Patent Document

Patent Document 1: Japanese Patent Application Laid-Open No. 2008-113224

SUMMARY OF THE INVENTION

Problems to be Solved by the Invention

Incidentally, in a case where streaming is performed using a network including an unstable communication path such as a wireless communication path, it is required to know what state the network is in.

The present technology has been made in view of such a situation, and makes it possible to properly find out the state of a network in which streaming is performed.

Solutions to Problems

A communication system of the present technology includes: a reception apparatus; a transmission apparatus that performs streaming to the reception apparatus; and a control apparatus that manages a state of a network that connects the reception apparatus and the transmission apparatus and includes a first communication line and a second communication line, in which the first communication line is unstable in connection state as compared with the second communication line, and the control apparatus manages a state of the network on the basis of a packet transmitted from the transmission apparatus to the reception apparatus.

A control apparatus of the present technology includes a control part that manages a state of a network that connects a reception apparatus and a transmission apparatus that performs streaming to the reception apparatus, and includes a first communication line and a second communication line, in which the first communication line is unstable in connection state as compared with the second communication line, and the control part manages a state of the network on the basis of a packet transmitted from the transmission apparatus to the reception apparatus.

In the present technology, a state of a network that connects a reception apparatus and a transmission apparatus that performs streaming to the reception apparatus, and includes a first communication line and a second communication line is managed and, while the first communication line is unstable in connection state as compared with the second communication line, a state of the network is managed on the basis of a packet transmitted from the transmission apparatus to the reception apparatus.

Effects of the Invention

According to the present technology, the state of a network in which streaming is performed can be properly found out.

Note that the effects described herein are not necessarily limited and any effects described in the present disclosure may be applied.

MODE FOR CARRYING OUT THE INVENTION

Modes for carrying out the present disclosure (hereinafter, referred to as embodiments) will be described below. Note that the description will be given in the following order.

1. Configuration of Communication System
2. First Embodiment (Finding out of Network State Based on Streaming Reception State)
3. Second Embodiment (Finding out of Network State Based on Bandwidth Estimation Result)
4. Configuration of Communication system Compatible with Bonding
5. Application Examples

1. CONFIGURATION OF COMMUNICATION SYSTEM

Configuration Example of Communication System

Figure 1:
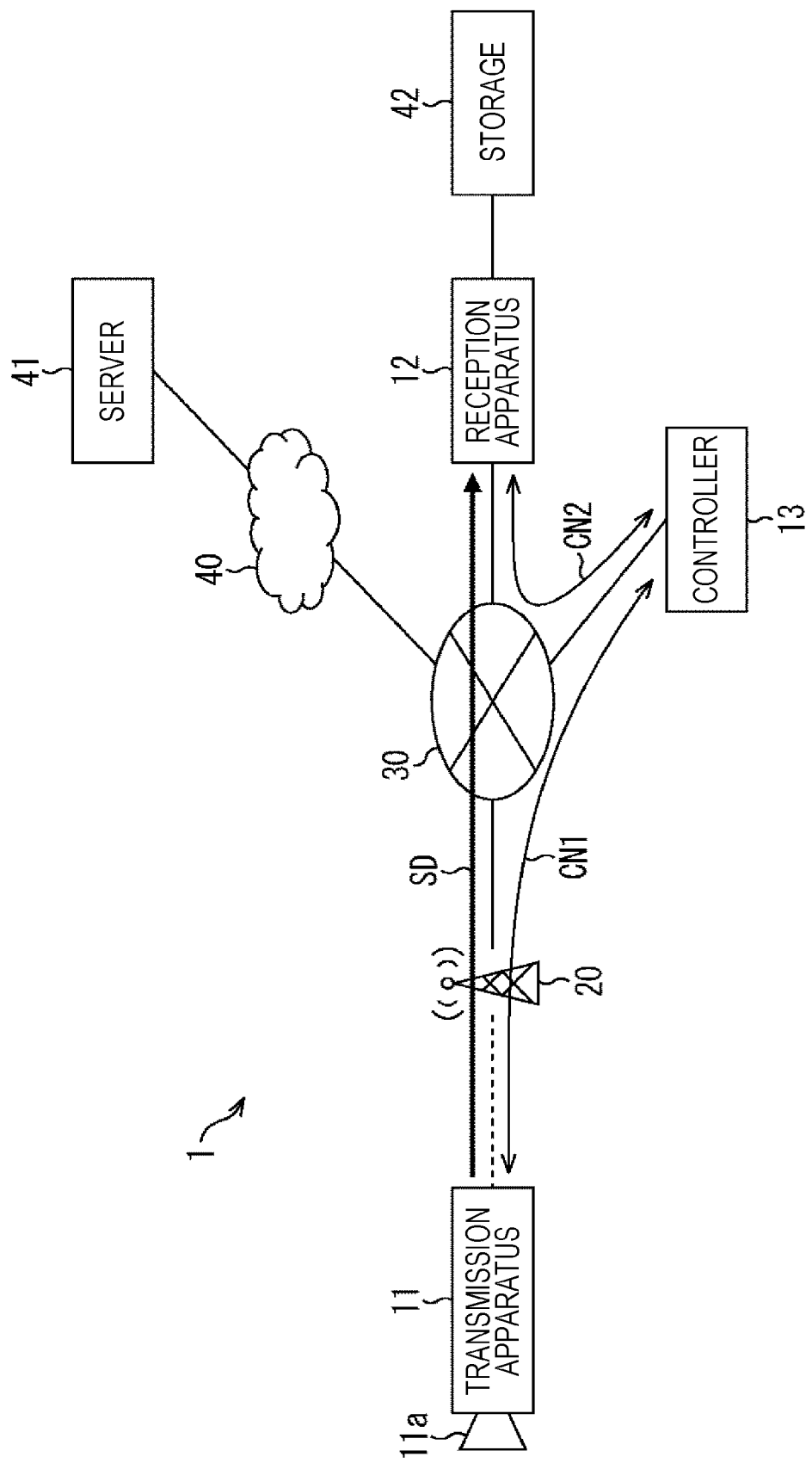
FIG. 1 is a diagram illustrating a configuration example of a communication system according to the present embodiment.

FIG. 1 is a diagram illustrating a configuration example of a communication system according to the present embodiment.

In the communication system 1 in FIG. 1, a moving image being captured by a transmission apparatus 11 is transmitted to a reception apparatus 12 in real time by the transmission apparatus 11 performing streaming by a user datagram protocol (UDP).

The transmission apparatus 11 is configured as, for example, an imaging apparatus such as a camcorder and transmits data of a moving image (moving image data) captured by an imaging unit 11a to the reception apparatus 12 in real time. Note that the transmission apparatus 11 and the imaging apparatus may be configured apart from each other.

The reception apparatus 12 is configured as, for example, a streaming receiver provided in a broadcasting station for television broadcasting, and receives moving image data transmitted from the transmission apparatus 11. The moving image data received by the reception apparatus 12 is distributed by broadcast waves.

The transmission apparatus 11 and the reception apparatus 12 are connected via a network including a first communication line including a wireless communication line and a second communication line including only a wired communication line.

The first communication line mentioned here is assumed to refer to a communication line between the transmission apparatus 11 and the Internet 30 via a base station 20, and the second communication line is assumed to refer to a communication line between the Internet 30 and the reception apparatus 12. The first communication line is unstable in connection state as compared with the second communication line, and has larger delay or packet loss. Note that, for example, communication in compliance with the 3rd generation (3G) or long term evolution (LTE) scheme is performed between the transmission apparatus 11 and the base station 20.

The transmission apparatus 11 can transmit moving image data SD obtained by capturing, by performing streaming. Streaming is performed between the transmission apparatus 11 and the reception apparatus 12 by performing quality of service (QoS) control.

A controller 13 is connected to the Internet 30. The controller 13 is provided, for example, in a broadcasting station for television broadcasting similarly to the reception apparatus 12.

The controller 13 is a control apparatus that manages the state of a network including a communication line between the transmission apparatus 11 and the Internet 30 (first communication line) and a communication line between the Internet 30 and the reception apparatus 12 (second communication line). For example, the controller 13 manages the state of streaming between the transmission apparatus 11 and the reception apparatus 12 through a transmission control protocol (TCP) connection. Specifically, the controller 13 establishes a connection CN1 with the transmission apparatus 11, thereby exchanging data with the transmission apparatus 11. Furthermore, the controller 13 establishes a connection CN2 with the reception apparatus 12, thereby exchanging data with the reception apparatus 12.

Note that the controller 13 is only needs to be connected to the network constituting the communication system 1 and, as illustrated in FIG. 1, may be connected to the Internet 30 alone or provided on a cloud 40. Furthermore, the controller 13 may be configured to be integrated with the reception apparatus 12 or may be configured to be integrated with the transmission apparatus 11.

Moreover, a server 41 on the cloud 40 is connected to the Internet 30. Moving image data received by the reception apparatus 12 can be distributed by way of the Internet 30 by the server 41 on the cloud 40.

Furthermore, moving image data received by the reception apparatus 12 may be saved in a storage 42 connected to the reception apparatus 12, for example, in a broadcasting station.

Configuration Example of Controller

Figure 2:
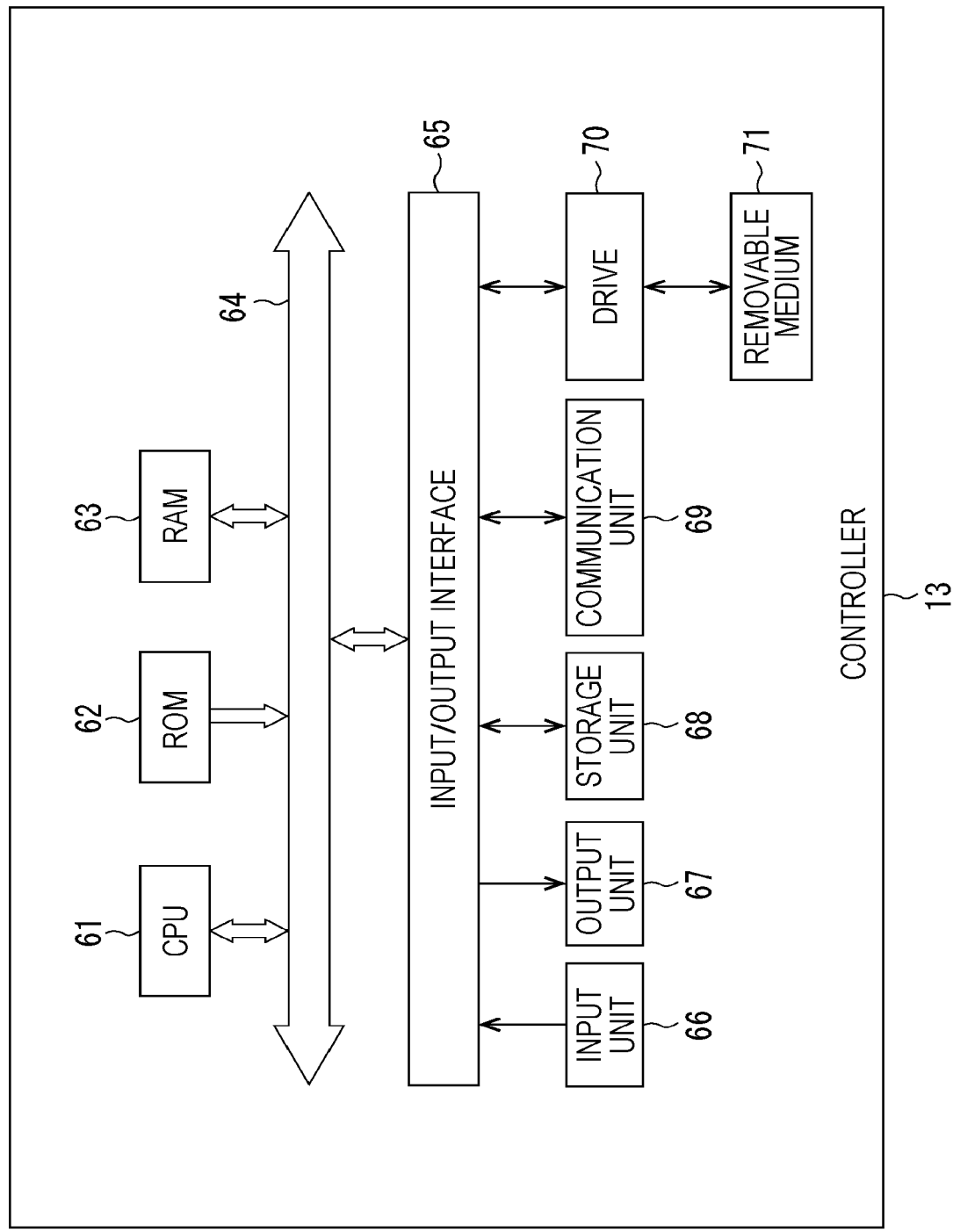
FIG. 2 is a block diagram illustrating a configuration example of a controller.

FIG. 2 is a block diagram illustrating a configuration example of the controller 13.

In the controller 13 in FIG. 2, a central processor unit (CPU) 61 executes processes for implementing various functions included in the controller 13 in accordance with a program stored in a read only memory (ROM) 62 or a program loaded in a random access memory (RAM) 63. Data required by the CPU 61 when executing the various processes, and the like are also appropriately stored in the RAM 63.

The CPU 61, the ROM 62, and the RAM 63 are mutually connected via a bus 64. Furthermore, an input/output interface 65 is connected to this bus 64.

An input unit 66, an output unit 67, a storage unit 68, and a communication unit 69 are connected to the input/output interface 65.

The input unit 66 is configured from a key, a button, a touch panel, a microphone, and the like, and the output unit 67 is configured from a display, a speaker, and the like. The storage unit 68 is configured from a hard disk or the like, and the communication unit 69 is configured from a communication module or the like that performs wired communication.

Furthermore, a drive 70 is connected to the input/output interface 65 as necessary, and a removable medium 71 configured from a semiconductor memory or the like is appropriately attached. A computer program read from the removable medium 71 is installed in the storage unit 68 as necessary.

Note that the configurations of the transmission apparatus 11 and the reception apparatus 12 are basically similar to the configuration of the controller 13 in FIG. 2 except that the transmission apparatus 11 includes an imaging unit, and thus description thereof will be omitted.

2. FIRST EMBODIMENT

As described above, in the communication system 1, the controller 13 manages the state of the network that connects the transmission apparatus 11 and the reception apparatus 12. Here, a configuration in which the controller 13 finds out the state of the network on the basis of the streaming reception state in the reception apparatus 12 will be described.

Functional Configuration Example of Communication System

Figure 3:
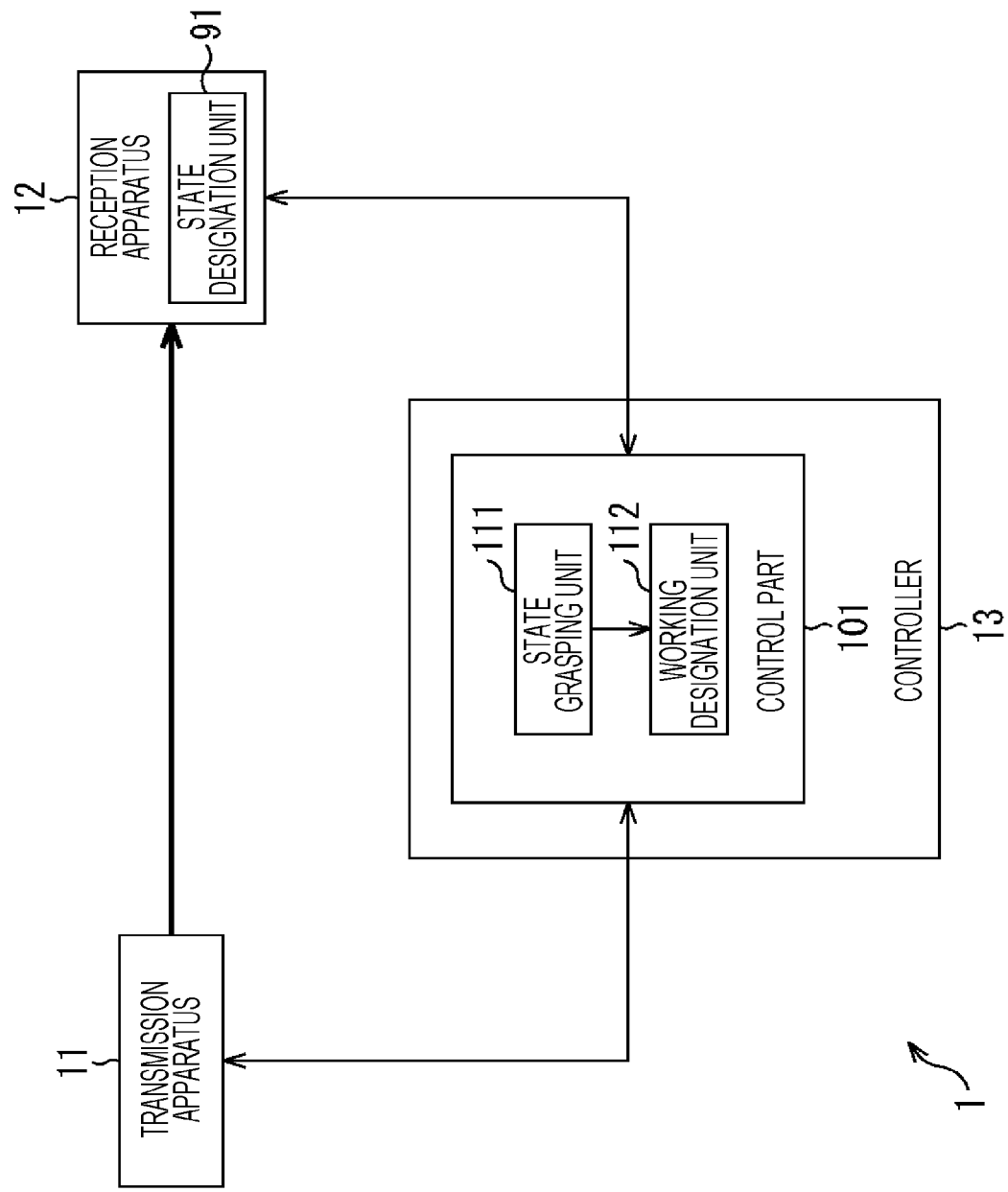
FIG. 3 is a block diagram illustrating a functional configuration example of a communication system of a first embodiment.

FIG. 3 is a block diagram illustrating a functional configuration example of the communication system 1 according to the present embodiment.

In the communication system 1 in FIG. 3, the reception apparatus 12 implements a state designation unit 91 by a predetermined program executed by a CPU (not illustrated). Furthermore, the controller 13 implements a control part 101 by a predetermined program executed by the CPU 61.

The control part 101 manages the state of a network that connects the transmission apparatus 11 and the reception apparatus 12, and includes a state grasping unit 111 and a working designation unit 112.

The state designation unit 91 of the reception apparatus 12 designates the reception state of streaming by UDP in the reception apparatus 12 on the basis of a packet transmitted from the transmission apparatus 11. In the following, the reception state of streaming by UDP in the reception apparatus 12 is appropriately referred to also as a streaming state in the reception apparatus 12.

The state grasping unit 111 of the controller 13 grasps the reception state of streaming by UDP (streaming state) in the reception apparatus 12 via the TCP connection and notifies the working designation unit 112 of the contents of the grasped reception state.

The working designation unit 112 designates the working of the reception apparatus 12 by finding out the network state on the basis of the streaming state in the reception apparatus 12 grasped by the state grasping unit 111. The working of the reception apparatus 12 refers to the working of the reception apparatus 12 required according to the network state at a particular time, such as continuation or stop of streaming currently being performed. The working designation unit 112 notifies the reception apparatus 12 of the designated working of the reception apparatus 12 via the TCP connection.

Transition of Streaming State and Working Designation Process for Reception Apparatus Here, the transition of the streaming state in the reception apparatus 12 designated by the state designation unit 91 will be described with reference to FIG. 4.

Figure 4:
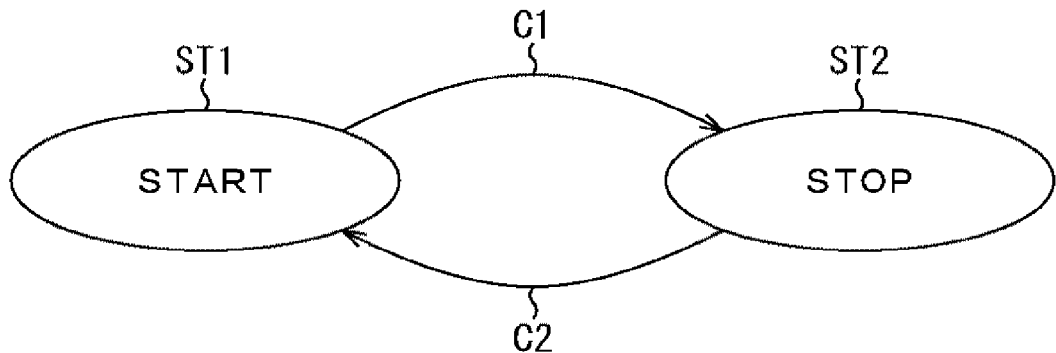
FIG. 4 is a diagram for explaining a transition of a streaming state.

FIG. 4 illustrates a state ST1 (START) indicating continuation (start) of streaming and a state ST2 (STOP) indicating stop of streaming currently being performed, as the streaming states.

As illustrated in FIG. 4, when a condition C1 is satisfied while the streaming state is in the state ST1, the streaming state transitions to the state ST2. Furthermore, when a condition C2 is satisfied while the streaming state is in the state ST2, the streaming state transitions to the state ST1. Whether or not the conditions C1 and C2 are satisfied is determined by the state designation unit 91 of the reception apparatus 12.

For example, the condition C1 is assumed to be a condition that a reception interval of a real-time transport protocol (RTP) packet from the transmission apparatus 11 in the reception apparatus 12 exceeds a certain time, or the amount of packet loss within a predetermined time after QoS control exceeds a certain amount.

Furthermore, the condition C2 is assumed to be a condition that a reception interval of a RTP packet from the transmission apparatus 11 in the reception apparatus 12 does not exceed a certain time, and the amount of packet loss within a predetermined time after QoS control is equal to or less than a certain amount.

Figure 5:
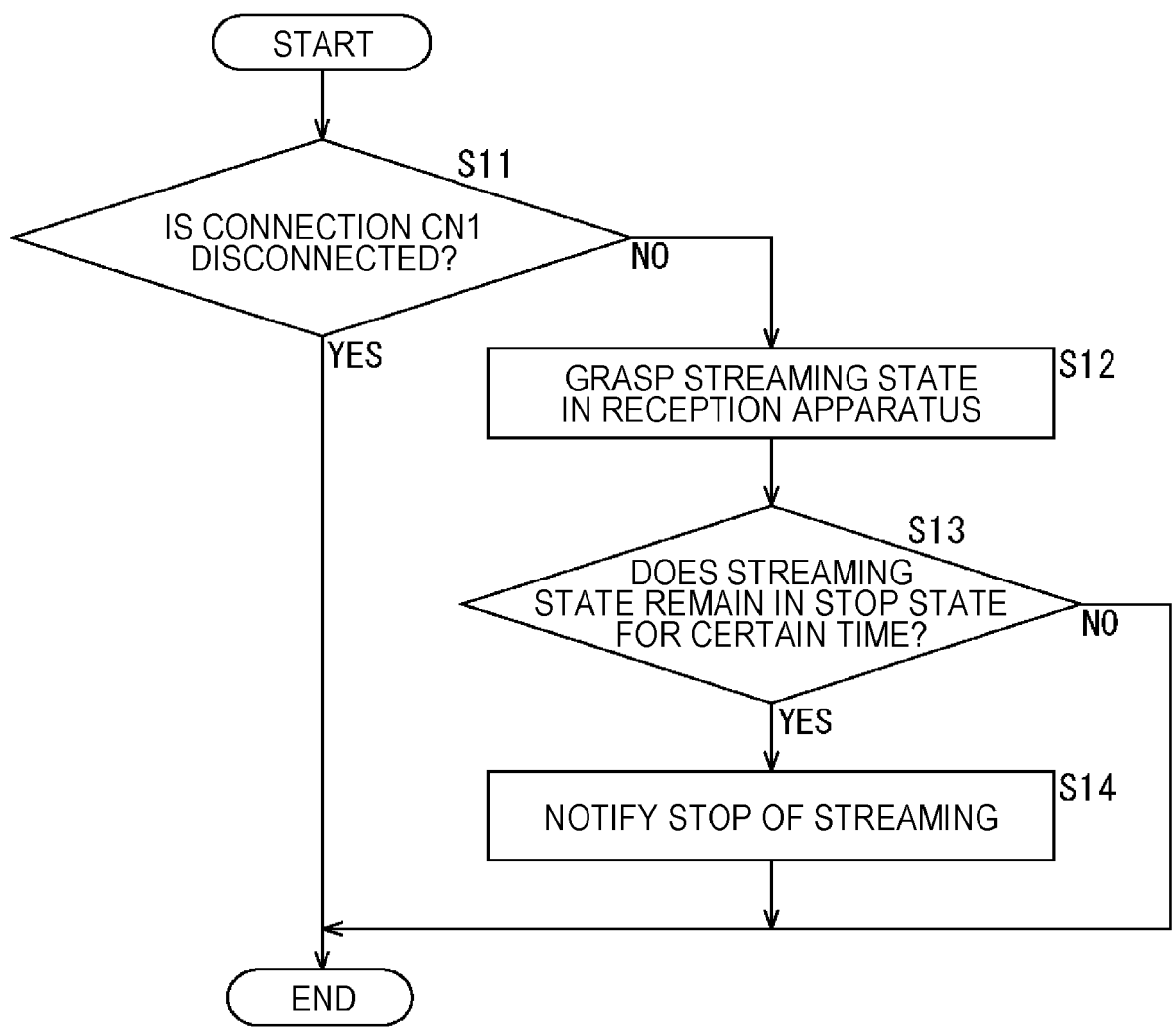
FIG. 5 is a flowchart for explaining a working designation process for a reception apparatus.

Next, a working designation process for the reception apparatus 12 will be described with reference to a flowchart in FIG. 5.

In step S11, the control part 101 determines whether or not the connection CN1 with the transmission apparatus 11 is disconnected.

In a case where it is determined in step S11 that the connection CN1 is not disconnected, the control part 101 can grasp the state of streaming through the connection CN1 with the transmission apparatus 11 and the connection CN2 with the reception apparatus 12, and thus does nothing; then, the process ends.

On the other hand, in a case where it is determined in step S11 that the connection CN1 is disconnected, the process proceeds to step S12.

In step S12, the state grasping unit 111 grasps the streaming state in the reception apparatus 12 designated by the state designation unit 91, via the TCP connection (CN2). Here, the state grasping unit 111 may grasp the streaming state by receiving a notification regarding the streaming state from the state designation unit 91 of the reception apparatus 12, or the state grasping unit 111 by itself may grasp the streaming state by referring to the streaming state designated by the state designation unit 91 of the reception apparatus 12.

In step S13, the state grasping unit 111 determines whether or not the streaming state in the reception apparatus 12 remains in the STOP state (the state ST2 indicating stop of streaming) for a certain time.

In a case where it is determined in step S13 that the streaming state does not remain in the STOP state for a certain time, the working designation unit 112 does nothing (a state in which the streaming is being performed is kept), and the process ends.

With this procedure, even in a case where the TCP connection between the transmission apparatus 11 and the controller 13 connected via an unstable wireless communication line is disconnected for some reason, it is found out through the TCP connection between the controller 13 and the reception apparatus 12 that there is no difficulty in the reception state of streaming by UDP, and thus the streaming can be continuously performed without stopping.

On the other hand, in a case where it is determined in step S13 that the streaming state remains in the STOP state for a certain time, in step S14, the working designation unit 112 designates to stop the streaming and notifies the reception apparatus 12 to that effect. In this case, the reception apparatus 12 stops an application relating to streaming, according to the notification from the working designation unit 112.

Note that, in a case where the network state becomes better after the streaming is stopped and the connection CN1 is established again, the control part 101 can instruct the transmission apparatus 11 to start streaming.

According to the above process, the state of the network in which streaming is performed can be properly found out on the basis of the streaming reception state in the reception apparatus 12; accordingly, even with a network including an unstable communication path, stable streaming can be provided according to the state of the network.

Note that, in the above-described process, the streaming state (stopping or starting of streaming) may be designated on the basis of either the reception interval of the RTP packet in the reception apparatus 12 or the amount of packet loss within a predetermined time after QoS control.

3. SECOND EMBODIMENT

In the above description, a configuration in which the state of the network is found out on the basis of the streaming reception state in the reception apparatus 12 has been described. Here, a configuration in which a controller 13 finds out the state of the network on the basis of the result of network bandwidth estimation will be described.

Functional Configuration Example of Communication System

Figure 6:
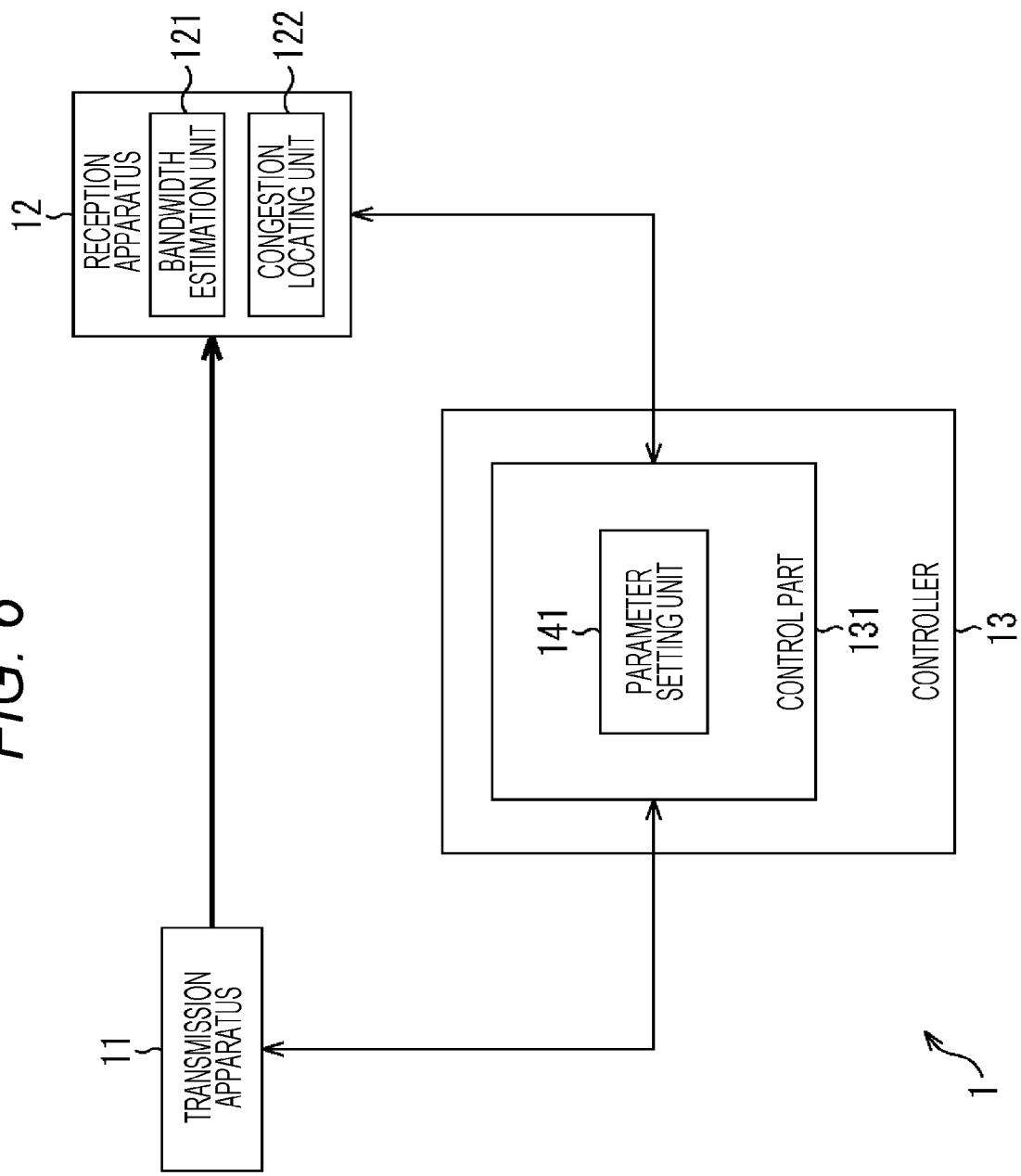
FIG. 6 is a block diagram illustrating a functional configuration example of a communication system of a second embodiment.

FIG. 6 is a block diagram illustrating a functional configuration example of a communication system 1 according to the present embodiment.

In the communication system 1 in FIG. 6, a reception apparatus 12 implements a bandwidth estimation unit 121 and a congestion locating unit 122 by a predetermined program executed by a CPU (not illustrated). Furthermore, the controller 13 implements a control part 131 by a predetermined program executed by a CPU 61.

The control part 131 manages the state of a network that connects a transmission apparatus 11 and the reception apparatus 12, and includes a parameter setting unit 141.

The bandwidth estimation unit 121 of the reception apparatus 12 estimates the bandwidth of a network in which streaming is performed with the transmission apparatus 11, on the basis of a packet transmitted from the transmission apparatus 11. The estimation result (the bandwidth of the network) is notified to the controller 13 via the TCP connection.

The congestion locating unit 122 locates congestion in a network in which streaming is performed with the transmission apparatus 11, on the basis of a packet transmitted from the transmission apparatus 11. The congestion locating result by the congestion locating unit 122 is used for bandwidth estimation by the bandwidth estimation unit 121.

The parameter setting unit 141 of the controller 13 sets a parameter relating to streaming performed by the transmission apparatus 11, on the basis of the network bandwidth estimated by the reception apparatus 12.

Network Bandwidth Estimation Process

Figure 7:
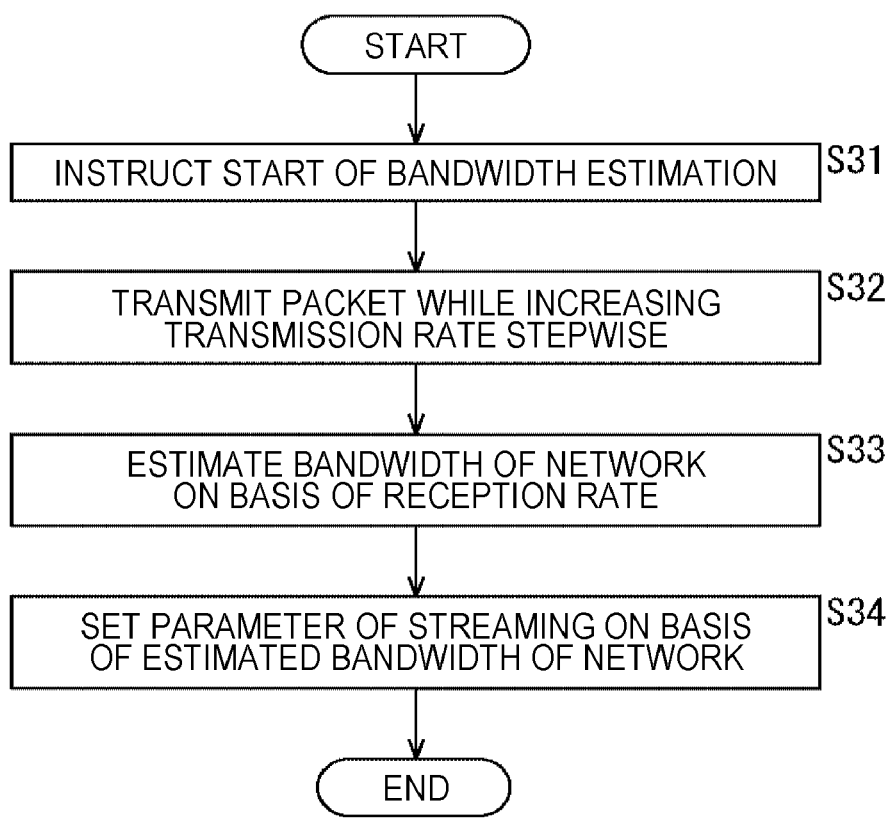
FIG. 7 is a flowchart for explaining a network bandwidth estimation process.

Next, a network bandwidth estimation process in the communication system 1 in FIG. 6 will be described with reference to a flowchart in FIG. 7. The process in FIG. 7 is executed before the transmission apparatus 11 starts streaming.

In step S31, the controller 13 instructs the transmission apparatus 11 and the reception apparatus 12 to start bandwidth estimation, via the TCP connection.

Figure 8:
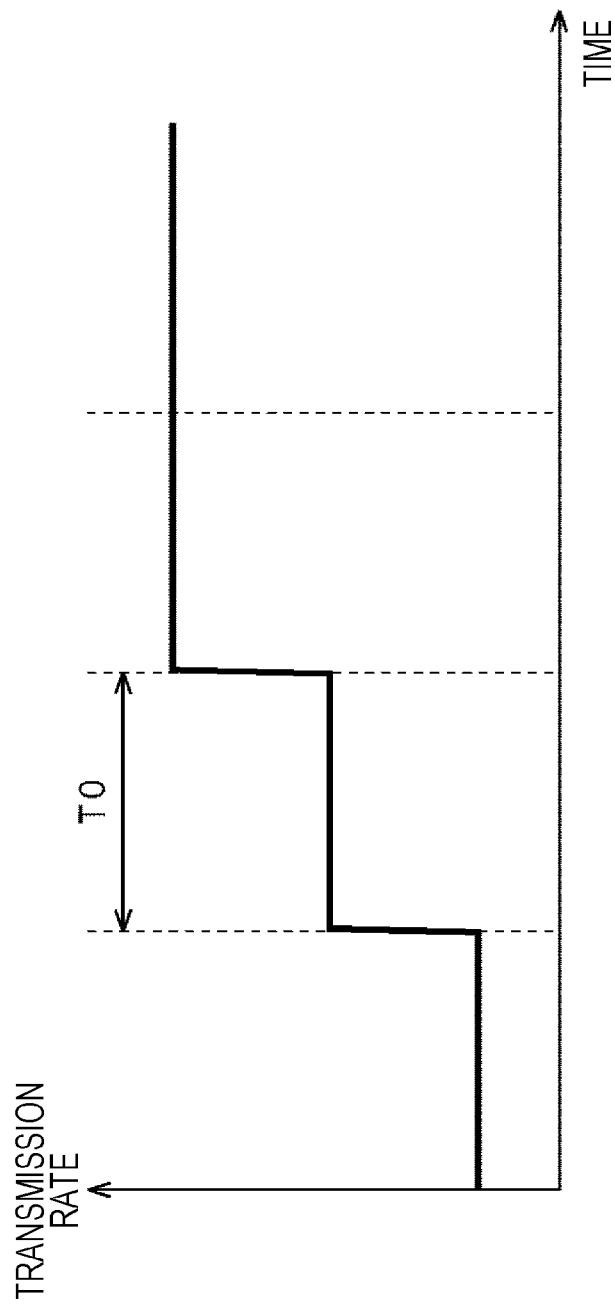
FIG. 8 is a diagram illustrating an example of a packet transmission rate.

In step S32, the transmission apparatus 11 transmits a packet according to the instruction from the controller 13 while increasing the transmission rate stepwise every certain time, as illustrated in FIG. 8.

FIG. 8 illustrates an example of the transmission rate of a packet transmitted by the transmission apparatus 11. In the example in FIG. 8, the transmission rate grows stepwise every time T0. Note that time T0 is assumed as a time preset between the transmission apparatus 11 and the reception apparatus 12.

Returning to the flowchart in FIG. 7, in step S33, the bandwidth estimation unit 121 of the reception apparatus 12 estimates the bandwidth of the network on the basis of the reception rate of a packet received from the transmission apparatus 11. The estimated bandwidth of the network is notified to the controller 13.

In step S34, the parameter setting unit 141 of the controller 13 sets a parameter relating to streaming on the basis of the estimated bandwidth of the network. For example, the resolution, transmission rate, and the like of a moving image transmitted by streaming are set as the parameters.

Then, the controller 13 instructs the transmission apparatus 11 to start streaming with the set parameters via the TCP connection.

According to the above process, the state of the network in which streaming is performed can be properly found out on the basis of the result of the network bandwidth estimation; accordingly, even with a network including an unstable communication path, stable streaming can be provided according to the state of the network.

Details of Network Bandwidth Estimation

Here, details of network bandwidth estimation performed in step S33 in FIG. 7 will be described.

Specifically, the bandwidth estimation unit 121 checks the reception rate of a packet received every predetermined lapse of time since the start of reception of a packet transmitted while the transmission rate is increased stepwise every certain time. Then, the bandwidth estimation unit 121 designates the range of a bandwidth corresponding to the reception rate when fluctuations of the reception rate are almost stable (hereinafter referred to as a reception estimation range).

Figure 9:
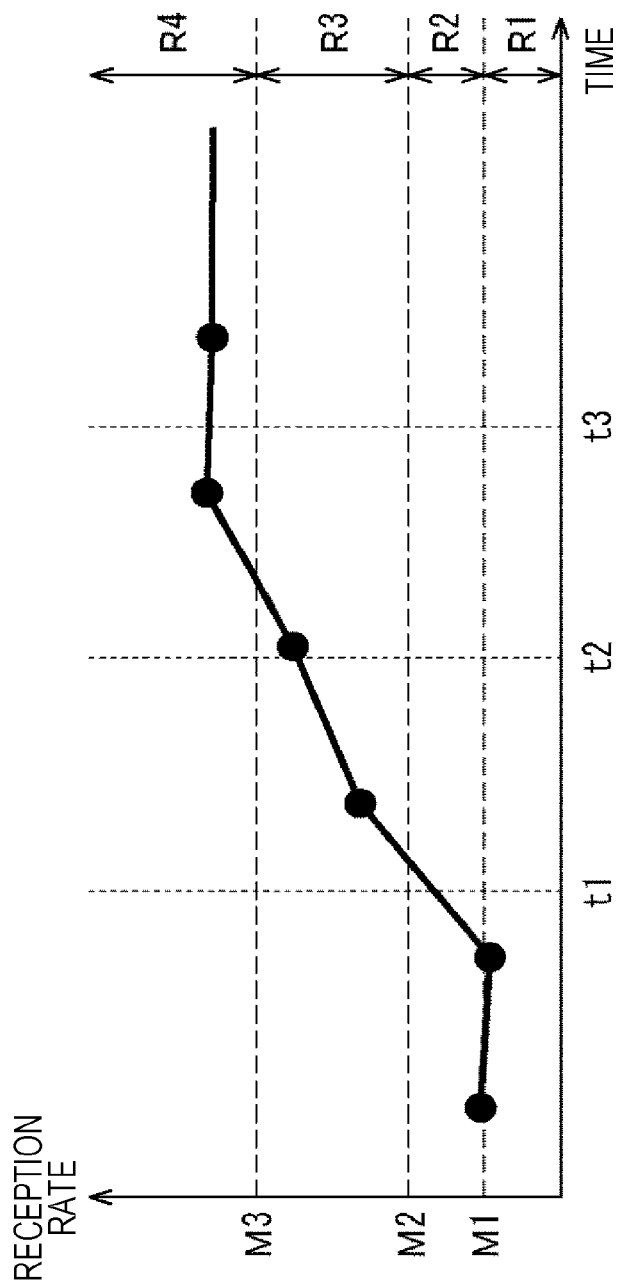
FIG. 9 is a diagram illustrating an example of a packet reception rate.

FIG. 9 is a diagram illustrating an example of the packet reception rate in the reception apparatus 12.

In FIG. 9, the reception rate at every particular time is plotted and illustrated.

First, when time t1 has elapsed since the start of packet reception, it is checked whether or not the reception rate exceeds a rate M1. If the reception rate does not exceed the rate M1, the reception estimation range is designated as R1. As in the example in FIG. 9, if the reception rate exceeds the rate M1 when t1 has elapsed, a check is performed when time t2 has elapsed since the start of packet reception.

When time t2 has elapsed since the start of packet reception, it is checked whether or not the reception rate exceeds a rate M2. If the reception rate does not exceed the rate M2, the reception estimation range is designated as R2. As in the example in FIG. 9, if the reception rate exceeds the rate M2 when t2 has elapsed, a check is performed when time t3 has elapsed since the start of packet reception.

When time t3 has elapsed since the start of packet reception, it is checked whether or not the reception rate exceeds a rate M3. If the reception rate does not exceed the rate M3, the reception estimation range is designated as R3. As in the example in FIG. 9, if the reception rate exceeds the rate M3 when t3 has elapsed, the reception estimation range is designated as R4.

Figure 10:
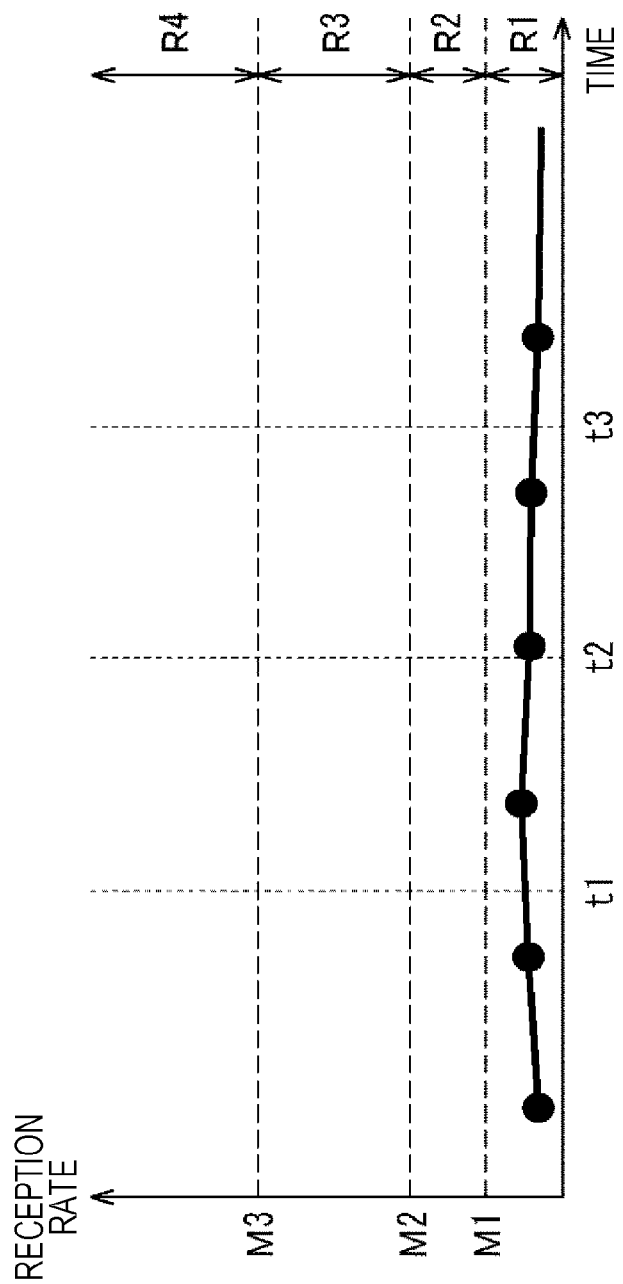
FIG. 10 is a diagram illustrating an example of a packet reception rate.

FIG. 10 is a diagram illustrating another example of the packet reception rate in the reception apparatus 12.

Also in FIG. 10, similarly to FIG. 9, the reception rate at every particular time is plotted and illustrated.

First, when time t1 has elapsed since the start of packet reception, it is checked whether or not the reception rate exceeds a rate M1. If the reception rate does not exceed the rate M1, the reception estimation range is designated as R1. In the example in FIG. 10, since the reception rate does not exceed the rate M1 when t1 has elapsed, the reception estimation range is designated as R1.

Reception Estimation Range Designation Process

Figure 11:
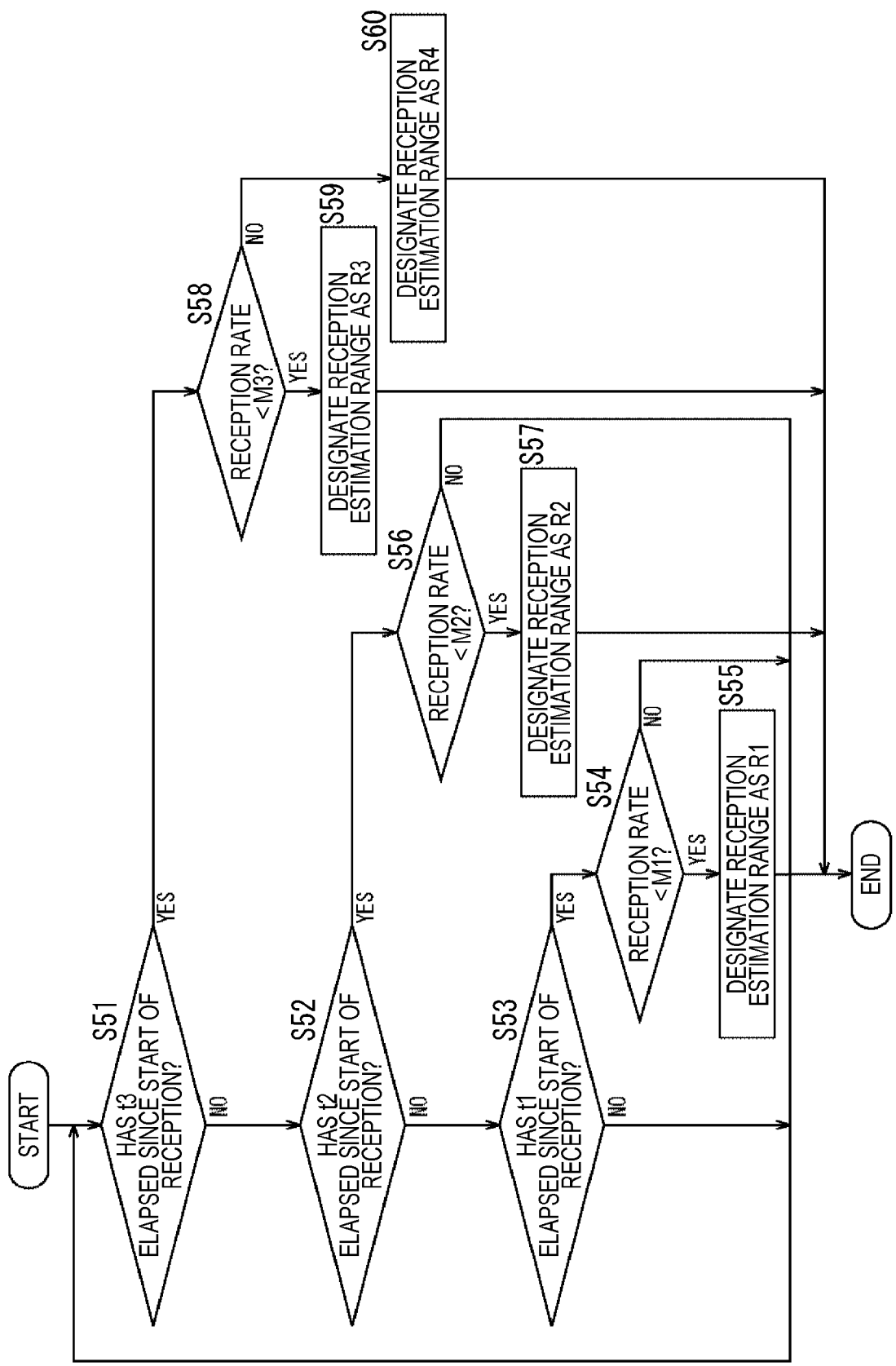
FIG. 11 is a flowchart for explaining a reception estimation range designation process.

FIG. 11 is a flowchart for explaining a designation process for the reception estimation range described with reference to FIGS. 9 and 10.

In step S51, the bandwidth estimation unit 121 of the reception apparatus 12 determines whether or not time t3 has elapsed since the start of reception of a packet from the transmission apparatus 11.

When it is determined that time t3 has not elapsed since the start of packet reception, the process proceeds to step S52, and the bandwidth estimation unit 121 determines whether or not time t2 has elapsed since the start of packet reception.

When it is determined that time t2 has not elapsed since the start of packet reception, the process proceeds to step S53, and the bandwidth estimation unit 121 determines whether or not time t1 has elapsed since the start of packet reception.

When it is determined that time t1 has not elapsed since the start of packet reception, the process returns to step S51, and the processes in steps S51 to S53 are repeated. Note that t1<t2<t3 is assumed to hold as illustrated in FIGS. 9 and 10.

When it is determined in step S53 that time t1 has elapsed since the start of packet reception while the processes in steps S51 to S53 are repeated, the process proceeds to step S54, and the bandwidth estimation unit 121 determines whether or not the reception rate is smaller than the rate M1.

When it is determined in step S54 that the reception rate is smaller than the rate M1, the process proceeds to step S55, and the bandwidth estimation unit 121 designates the reception estimation range as R1.

On the other hand, when it is determined in step S54 that the reception rate is greater than the rate M1, the process returns to step S51 again, and the processes in steps S51 to S53 are repeated.

When it is determined in step S52 that time t2 has elapsed since the start of packet reception while the processes in steps S51 to S53 are repeated, the process proceeds to step S56, and the bandwidth estimation unit 121 determines whether or not the reception rate is smaller than the rate M2.

When it is determined in step S56 that the reception rate is smaller than the rate M2, the process proceeds to step S57, and the bandwidth estimation unit 121 designates the reception estimation range as R2.

On the other hand, when it is determined in step S56 that the reception rate is greater than the rate M2, the process returns to step S51 again, and the processes in steps S51 to S53 are repeated.

When it is determined in step S51 that time t3 has elapsed since the start of packet reception while the processes in steps S51 to S53 are repeated, the process proceeds to step S58, and the bandwidth estimation unit 121 determines whether or not the reception rate is smaller than the rate M3.

When it is determined in step S58 that the reception rate is smaller than the rate M3, the process proceeds to step S59, and the bandwidth estimation unit 121 designates the reception estimation range as R3.

On the other hand, when it is determined in step S58 that the reception rate is greater than the rate M3, the process proceeds to step S60, and the bandwidth estimation unit 121 designates the reception estimation range as R4.

In this manner, the bandwidth of the network can be estimated by designating the reception estimation range.

Another Example of Reception Estimation Range Designation Process

In the above description, it is assumed that the reception estimation range is designated on the basis of the reception rate of a packet transmitted while the transmission rate is increased stepwise every certain time. Besides this technique, the reception estimation range may be designated on the basis of the network congestion locating result in the reception apparatus 12.

Figure 12:
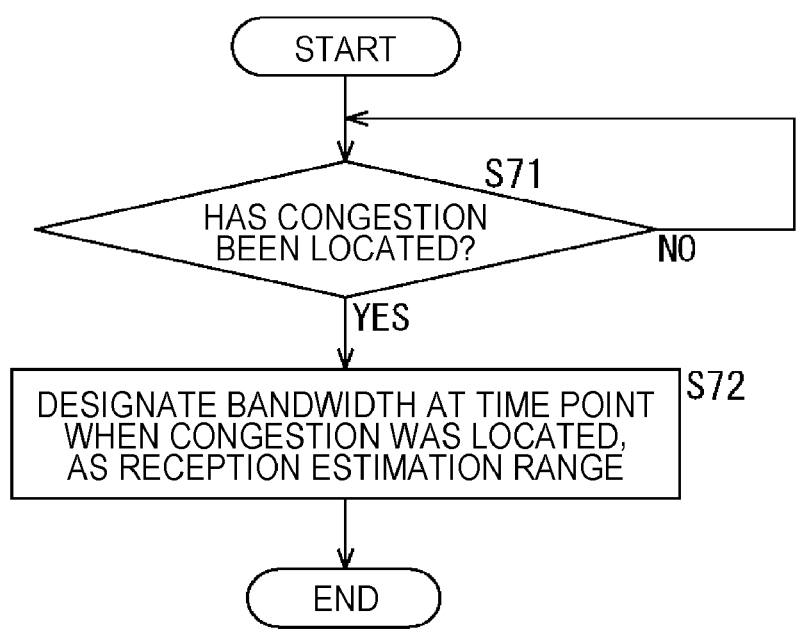
FIG. 12 is a flowchart for explaining a reception estimation range designation process.

FIG. 12 is a flowchart for explaining a designation process for the reception estimation range based on the network congestion locating result in the reception apparatus 12. The process in FIG. 12 is performed periodically, for example, every predetermined time.

In step S71, the bandwidth estimation unit 121 determines whether or not the congestion locating unit 122 has located network congestion on the basis of a packet transmitted from the transmission apparatus 11.

Specifically, the congestion locating unit 122 locates network congestion on the basis of a relative delay amount of the RTP packet from the transmission apparatus 11.

Figure 13:
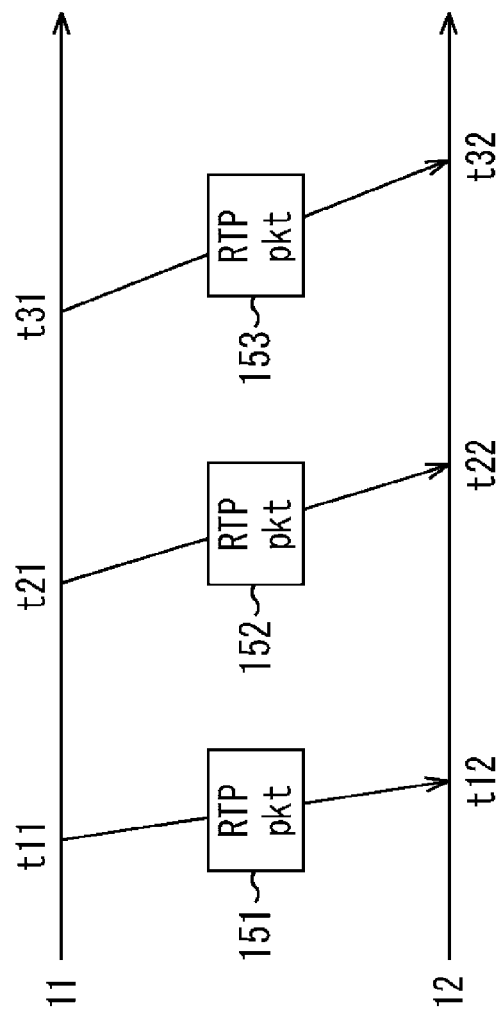
FIG. 13 is a diagram for explaining a specific example of network congestion locating.

For example, as illustrated in FIG. 13, it is assumed that the transmission apparatus 11 sequentially transmits RTP packets 151, 152, and 153 to the reception apparatus 12.

First, the congestion locating unit 122 works out a difference (relative delay amount) t12−t11 between transmission time t11 when the transmission apparatus 11 transmits the RTP packet 151 and reception time t12 when the transmission apparatus 12 receives the RTP packet 151. The transmission time t11 is included in the RTP packet 151. The congestion locating unit 122 locates network congestion depending on whether or not the relative delay amount t12−t11 exceeds a predetermined value.

Here, it is assumed that the relative delay amount t12−t11 is smaller than the predetermined value and no network congestion is located.

Next, the congestion locating unit 122 works out a difference (relative delay amount) t22−t21 between transmission time t21 when the transmission apparatus 11 transmits the RTP packet 152 and reception time t22 when the transmission apparatus 12 receives the RTP packet 152. The transmission time t21 is included in the RTP packet 152. The congestion locating unit 122 locates network congestion depending on whether or not the relative delay amount t22−t21 exceeds a predetermined value.

Here, it is assumed that the relative delay amount t22−t21 is smaller than the predetermined value and no network congestion is located.

Then, the congestion locating unit 122 works out a difference (relative delay amount) t32−t31 between transmission time t31 when the transmission apparatus 11 transmits the RTP packet 153 and reception time t32 when the transmission apparatus 12 receives the RTP packet 153. The transmission time t31 is included in the RTP packet 153. The congestion locating unit 122 locates network congestion depending on whether or not the relative delay amount t32−t31 exceeds a predetermined value.

Here, in a case where the relative delay amount t32−t31 is greater than the predetermined value, it is found out that network congestion has been located.

In this manner, the congestion locating unit 122 locates network congestion.

Subsequently, returning to the flowchart in FIG. 12, the process in step S71 is repeated until it is determined that the congestion locating unit 122 has located network congestion. Then, when it is determined that the congestion locating unit 122 has located network congestion, the process proceeds to step S72, and the bandwidth estimation unit 121 designates the range of a bandwidth at a time point when the network congestion was located, as the reception estimation range.

In this manner, the bandwidth of the network can also be estimated by designating the reception estimation range.

Another Example of Network Congestion Locating

In the above description, the reception apparatus 12 is assumed to locate network congestion; however, the transmission apparatus 11 may locate network congestion.

Specifically, the transmission terminal 11 may transmit a real-time transport control protocol (RTCP) packet to the reception apparatus 12 to locate network congestion on the basis of the presence or absence of feedback from the reception apparatus 12.

Figure 14:
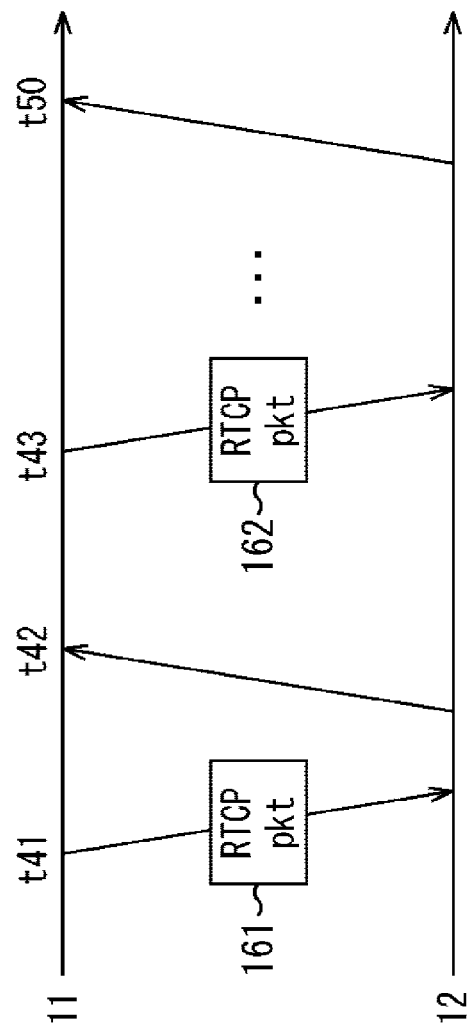
FIG. 14 is a diagram for explaining a specific example of network congestion locating.

For example, as illustrated in FIG. 14, it is assumed that the transmission apparatus 11 sequentially transmits RTCP packets 161 and 162 to the reception apparatus 12.

First, the transmission apparatus 11 works out a time t42−t41 from transmission time t41 when the RTCP packet 161 is transmitted to reception time t42 when the feedback from the reception apparatus 12 is received. The transmission apparatus 11 locates network congestion depending on whether or not the time t42−t41 is longer than a predetermined time.

Here, it is assumed that the time t42−t41 is shorter than the predetermined time, and no network congestion is located.

Next, the transmission apparatus 11 works out a time t50−t43 from transmission time t43 when the RTCP packet 162 is transmitted to reception time t50 when the feedback from the reception apparatus 12 is received. The transmission apparatus 11 locates network congestion depending on whether or not the time t50−t43 is longer than a predetermined time.

Here, in a case where the time t50−t43 is longer than the predetermined time or in a case where the feedback from the reception apparatus 12 fails to be received, it is found out that network congestion has been located.

In this manner, the transmission apparatus 11 can also locate network congestion.

Another Functional Configuration Example of Communication System

Furthermore, in the above description, the reception apparatus 12 is assumed to have the function of estimating the network bandwidth on the basis of the reception rate of the received packet and the network congestion locating result; however, the controller 13 may have this function.

Figure 15:
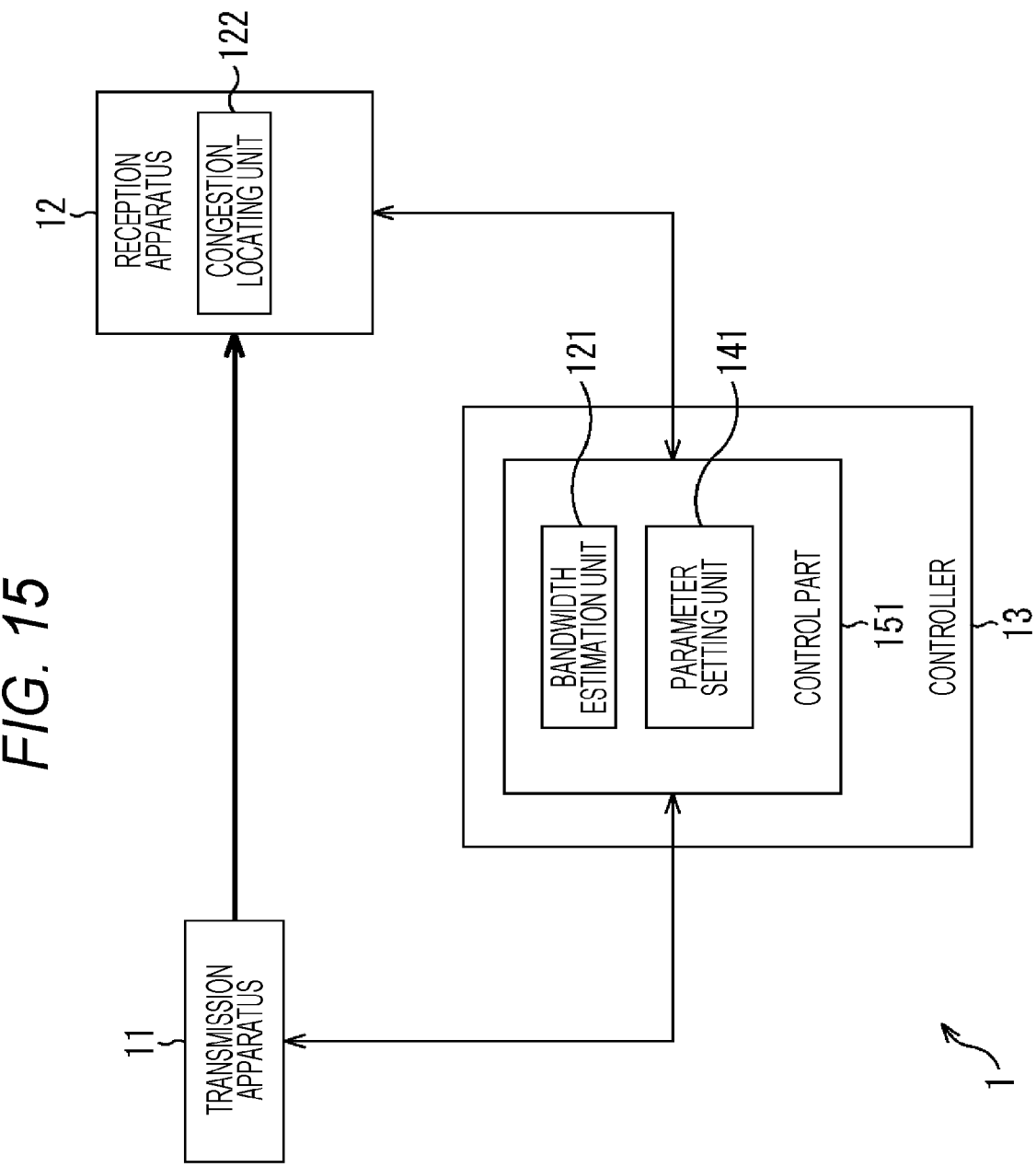
FIG. 15 is a block diagram illustrating another functional configuration example of the communication system of the second embodiment.

In this case, as illustrated in FIG. 15, the control part 151 of the controller 13 includes the bandwidth estimation unit 121 and the parameter setting unit 141. The bandwidth estimation unit 121 in FIG. 15 estimates the network bandwidth on the basis of the reception rate and the network congestion locating result notified from the reception apparatus 12.

Also in the communication system 1 in FIG. 15, similar actions and effects as those in the communication system 1 in FIG. 6 can be achieved.

4. CONFIGURATION OF COMMUNICATION SYSTEM COMPATIBLE WITH BONDING

In the above description, an example in which the present technology is applied to the communication system 1 that performs streaming from the transmission apparatus 11 via one base station 20 (one wireless communication line) has been described. However, the present technology is not limited to this example, and can also be applied to a communication system that performs streaming by bonding using a plurality of base stations (wireless communication lines) from the transmission apparatus 11.

Configuration Example of Communication System

Figure 16:
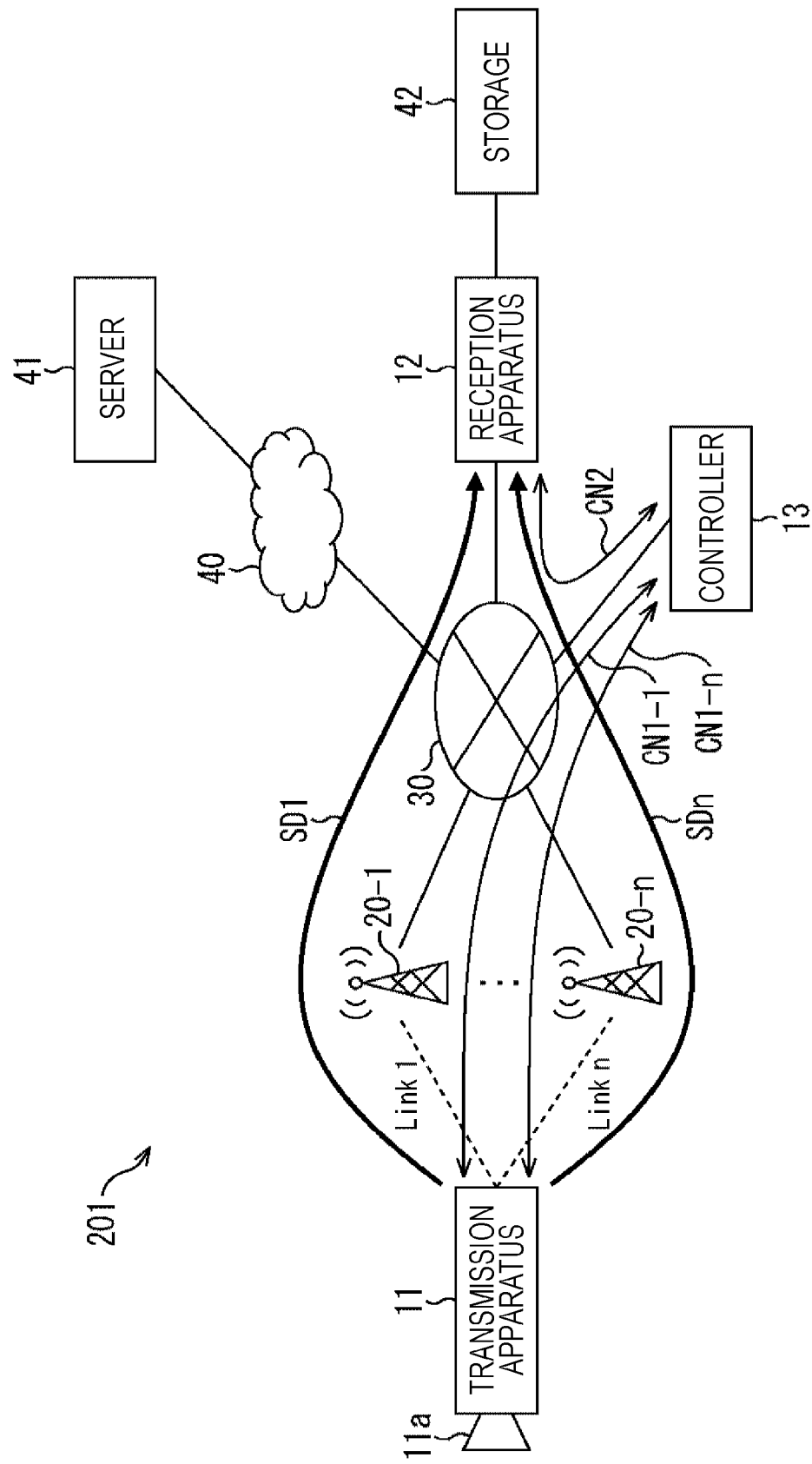
FIG. 16 is a diagram illustrating a configuration example of a communication system compatible with bonding.

FIG. 16 is a diagram illustrating a configuration example of a communication system compatible with bonding according to the present embodiment.

Also in the communication system 201 in FIG. 16, a moving image being captured by the transmission apparatus 11 is transmitted to the reception apparatus 12 in real time by the transmission apparatus 11 performing streaming by UDP.

Furthermore, in the communication system 201, the transmission apparatus 11 and the Internet 30 are connected via n base stations 20-1 to 20-$n$ (n wireless communication lines (links 1 to n)) (n≥2). Note that, in the following, the entire communication path by way of the link 1 is also referred to as link 1, and the entire communication path by way of the link 2 is also referred to as link 2 in some cases.

The transmission apparatus 11 performs streaming by bonding using n wireless communication lines, thereby being able to split moving image data obtained by capturing into data SD1 to data SDn to transmit.

In addition, the controller 13 establishes connections CN1-1 to CN1-$n$ via the n wireless communication lines with the transmission apparatus 11, thereby being able to exchange data with the transmission apparatus 11.

The technologies according to the first and second embodiments described above can be applied to the communication system 201 in FIG. 16.

In particular, in a case where the technology according to the first embodiment is applied to the communication system 201, in the communication system 201, the controller 13 finds out the state of the network on the basis of the reception state of streaming via the n wireless communication lines in the reception apparatus 12.

Functional Configuration Example of Communication System

Figure 17:
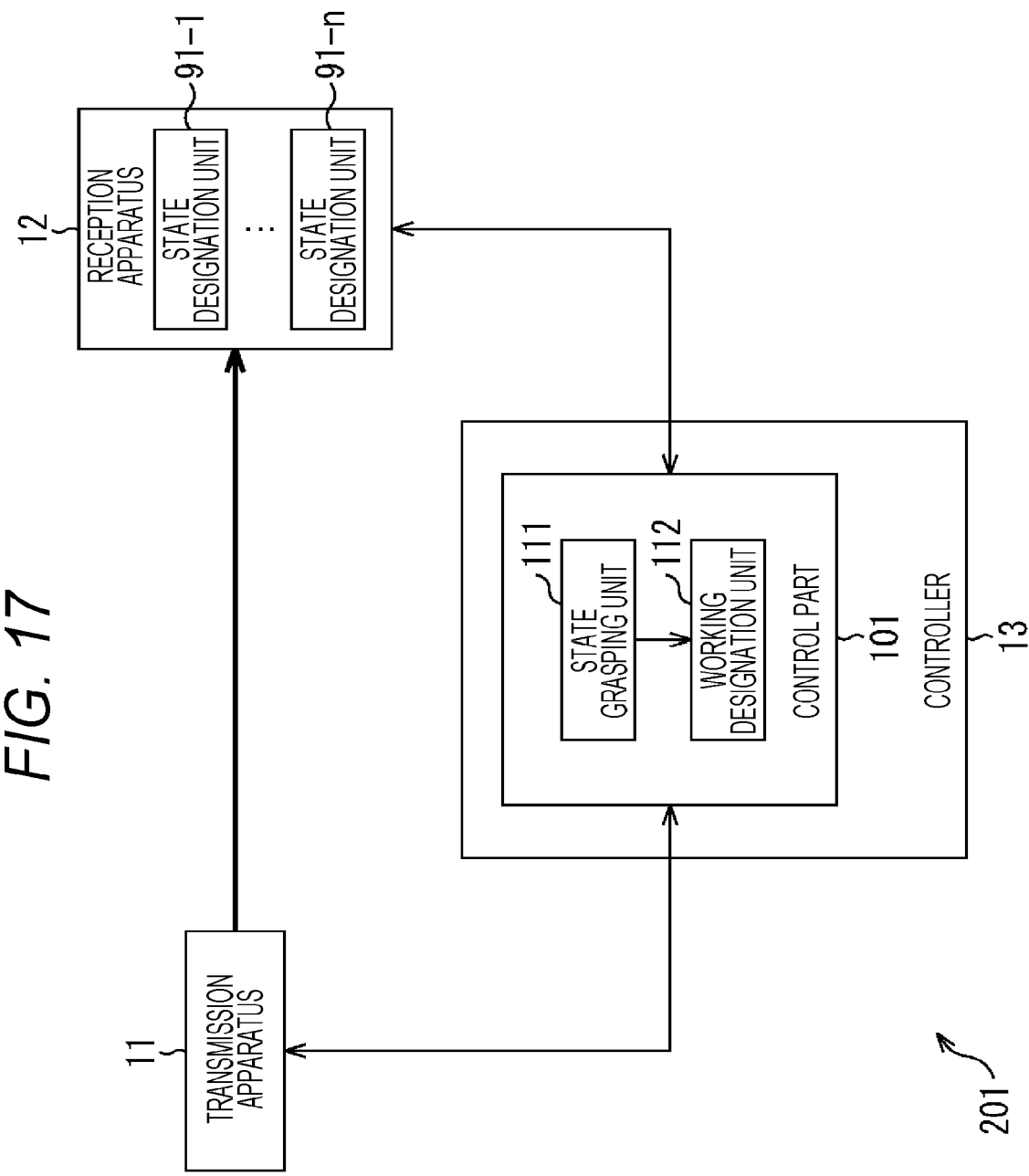
FIG. 17 is a block diagram illustrating a functional configuration example of the communication system in FIG. 16.

FIG. 17 is a block diagram illustrating a functional configuration example of the communication system 201 in FIG. 16 to which the technology according to the first embodiment is applied.

The reception apparatus 12 in FIG. 17 includes state designation units 91-1 to 91-*n* corresponding to the n wireless communication lines (links 1 to n), respectively.

The state designation units 91-1 to 91-*n* designate the streaming states of the respective links 1 to n in the reception apparatus 12.

In this case, the state grasping unit 111 of the controller 13 designates the streaming state of the entire links by grasping the streaming state of each single one of the links 1 to n in the reception apparatus 12 via the TCP connection (CN2).

Then, the working designation unit 112 designates the working of the reception apparatus 12 by finding out the network state on the basis of the streaming state of the entire links designated by the state grasping unit 111.

Working Designation Process for Reception Apparatus

Figure 18:
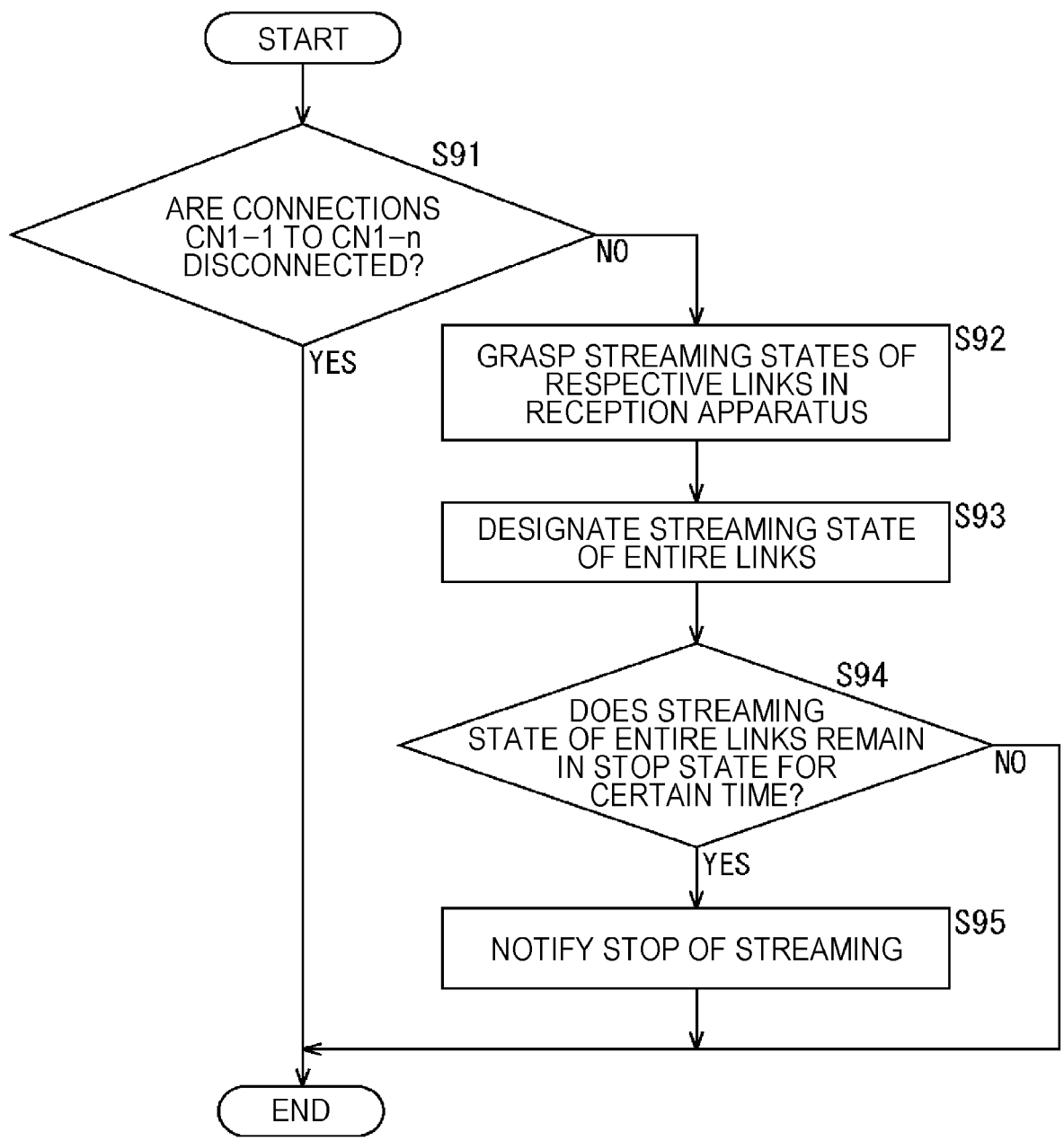
FIG. 18 is a flowchart for explaining a working designation process for a reception apparatus.

Next, a working designation process for the reception apparatus 12 will be described with reference to a flowchart in FIG. 18.

In step S91, the control part 101 determines whether or not the connections CN1-1 to CN1-*n* with the transmission apparatus 11 are disconnected.

In a case where it is determined in step S91 that any one of the connections CN1-1 to CN1-*n* is not disconnected, the control part 101 can grasp the streaming state through the connections CN1-1 to CN1-*n* with the transmission apparatus 11 and the connection CN2 with the reception apparatus 12, and thus does nothing; then, the process ends.

On the other hand, in a case where it is determined in step S91 that any one of the connections CN1-1 to CN1-*n* is disconnected, the process proceeds to step S92.

In step S92, the state grasping unit 111 grasps the streaming states of the respective links 1 to n in the reception apparatus 12 designated by the state designation units 91-1 to 91-*n*, via the TCP connection (CN2).

In step S93, the state grasping unit 111 designates the streaming state of the entire links on the basis of the streaming states of the respective links 1 to n in the reception apparatus 12.

In step S94, the state grasping unit 111 determines whether or not the streaming state of the entire links remains in the STOP state for a certain time.

In a case where it is determined in step S94 that the streaming state of the entire links does not remain in the STOP state for a certain time, the working designation unit 112 does nothing (a state in which the streaming is being performed is kept), and the process ends.

On the other hand, in a case where it is determined in step S94 that the streaming state of the entire links remains in the STOP state for a certain time, in step S95, the working designation unit 112 designates to stop the streaming and notifies the reception apparatus 12 to that effect. In this case, the reception apparatus 12 stops an application relating to streaming, according to the notification from the working designation unit 112.

Here, an example in which the streaming state of the entire links is designated on the basis of each of the streaming states of links 1 to n in step S93 in FIG. 18 will be described with reference to FIG. 19.

Figure 19:
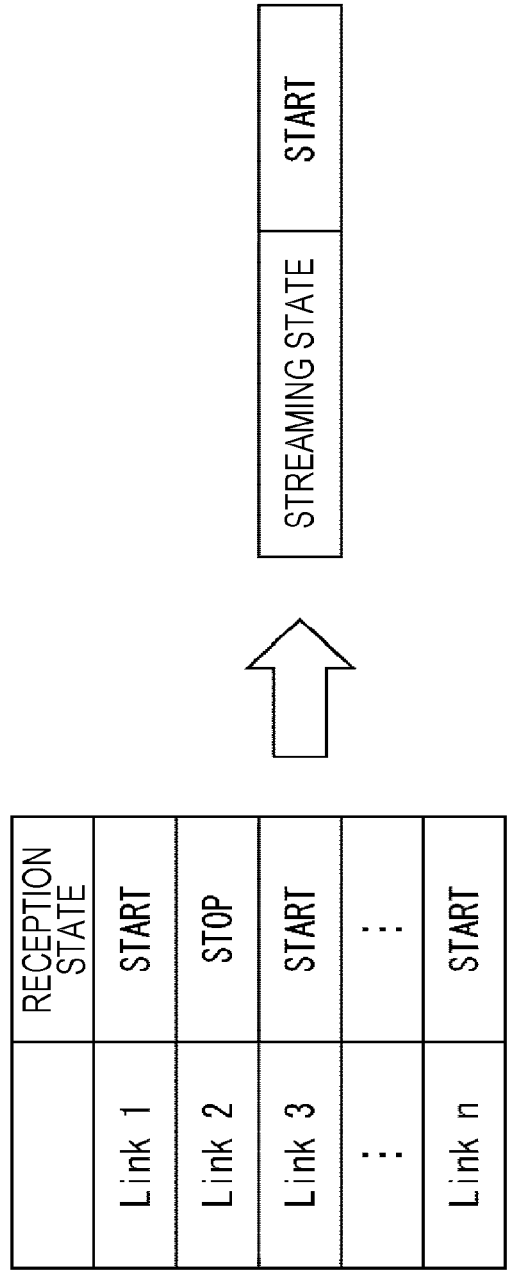
FIG. 19 is a diagram for explaining designation of the streaming state of the entire links.

In the example in FIG. 19, the state of streaming via the link 1 has been designated as START, the state of streaming via the link 2 has been designated as STOP, the state of streaming via the link 3 has been designated as START, . . . , and the state of streaming via the link n has been designated as START.

Then, in a case where the number of instances of START exceeds a predetermined number among the streaming states for the respective links 1 to n, the streaming state of the entire links is designated as START as illustrated in FIG. 19.

Furthermore, the streaming state of the entire links may be designated on the basis of the streaming states for the respective links 1 to n and the communication schemes in the respective links 1 to n (n wireless communication lines).

Figure 20:
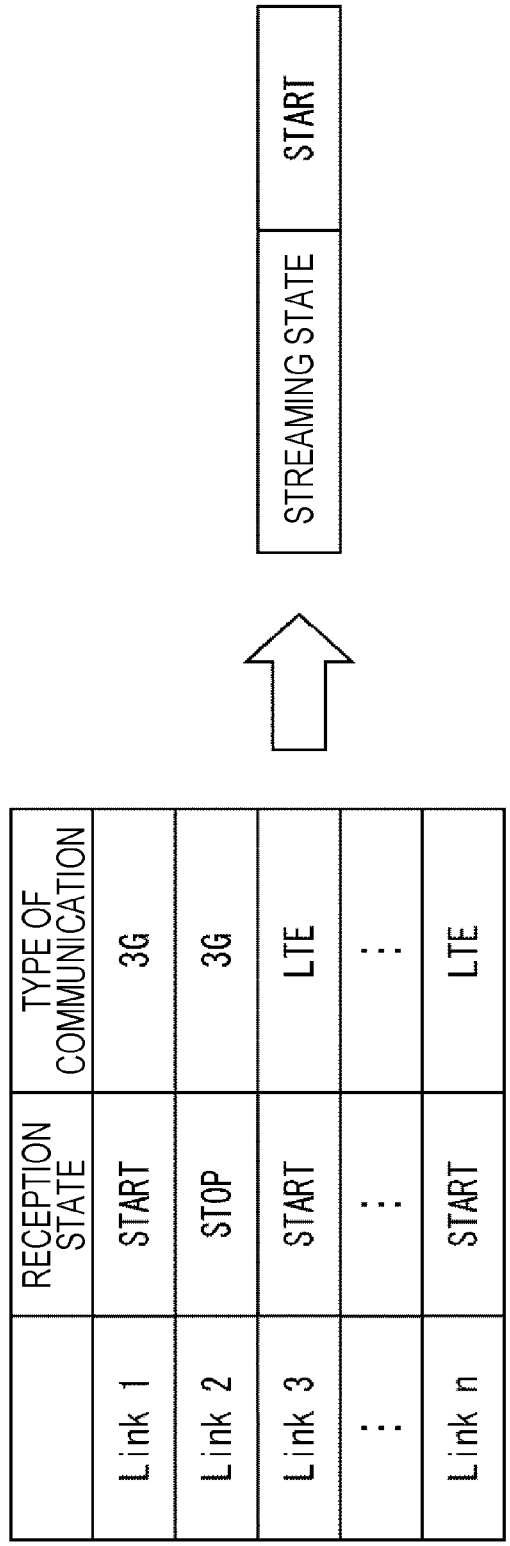
FIG. 20 is a diagram for explaining designation of the streaming state of the entire links.

FIG. 20 illustrates an example in which the streaming state of the entire links is designated on the basis of the streaming states for the respective links 1 to n and the communication schemes in the respective links 1 to n.

In the example in FIG. 20, the streaming states for the respective links 1 to n are similar to those in FIG. 19. Moreover, it has been determined that the communication scheme in the link 1 is 3G, the communication scheme in the link 2 is 3G, the communication scheme in the link 3 is LTE, . . . , and the communication scheme in the link n is LTE.

Then, in a case where the number of instances of START exceeds a predetermined number among the streaming states for the respective links 1 to n, and the number of instances of LTE capable of higher-speed communication exceeds another predetermined number among the communication schemes in the respective links 1 to n, the streaming state of the entire links is designated as START as illustrated in FIG. 20.

Also in the above process, the state of the network in which streaming is performed can be properly found out on the basis of the streaming reception state in the reception apparatus 12; accordingly, even with a network including an unstable communication path, stable streaming can be provided according to the state of the network.

In the above description, it has been assumed that the first communication line including the wireless communication line connects the transmission apparatus 11 and the Internet 30, and the second communication line including only the wired communication line connects the Internet 30 and the reception apparatus 12. The present technology is not limited to this configuration; the second communication line including only the wired communication line may connect the transmission apparatus 11 and the Internet 30, and the first communication line including the wireless communication line may connect the Internet 30 and the reception apparatus 12.

5. APPLICATION EXAMPLES

An example in which the technology according to the present disclosure is applied to the communication system that performs television broadcasting has been described above; however, the technology is not limited to this example and can be applied to a variety of systems. For example, the technology according to the present disclosure may be applied to a surgery room system.

Figure 21:
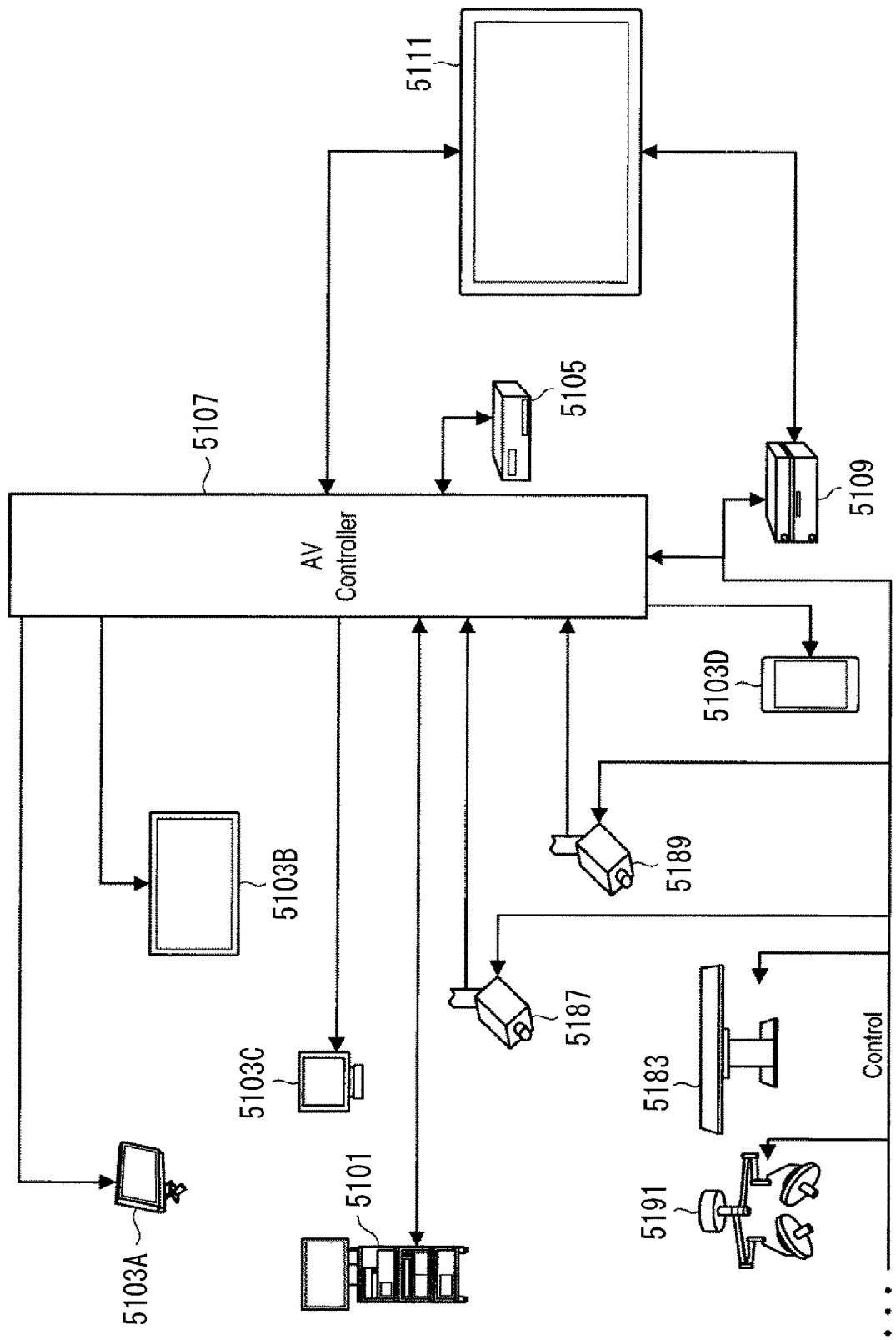
FIG. 21 is a diagram schematically illustrating the overall configuration of a surgery room system.

FIG. 21 is a diagram schematically illustrating the overall configuration of the surgery room system 5100 to which the technology according to the present disclosure can be applied. Referring to FIG. 21, the surgery room system 5100 is configured such that a group of apparatuses installed in a surgery room are connected to each other so as to be able to cooperate via an audio-visual controller (AV controller) 5107 and a surgery room control apparatus 5109.

A variety of apparatuses can be installed in the surgery room. FIG. 21 illustrates, as an example, an apparatus group 5101 of various types for a surgery through an endoscope, a ceiling camera 5187 provided on the ceiling of the surgery room to image the area around the hands of an operating surgeon, a surgical field camera 5189 provided on the ceiling of the surgery room to image events in the entire surgery room, a plurality of display apparatuses 5103A to 5103D, a recorder 5105, a patient bed 5183, and an illumination 5191.

Here, among these apparatuses, the apparatus group 5101 belongs to an endoscopic surgery system 5113 to be described later and includes an endoscope and a display apparatus or the like that displays an image captured by the endoscope. Each apparatus belonging to the endoscopic surgery system 5113 is also called as a medical instrument. Meanwhile, the display apparatuses 5103A to 5103D, the recorder 5105, the patient bed 5183, and the illumination 5191 are apparatuses situated, for example, in the surgery room apart from the endoscopic surgery system 5113. Each of these apparatuses not belonging to the endoscopic surgery system 5113 is also called as a non-medical instrument. The audio-visual controller 5107 and/or the surgery room control apparatus 5109 control working of these medical instruments and non-medical instruments cooperatively with each other.

The audio-visual controller 5107 comprehensively controls processes relating to image display in the medical instruments and non-medical instruments. Specifically, among the apparatuses included in the surgery room system 5100, the apparatus group 5101, the ceiling camera 5187, and the surgical field camera 5189 can be apparatuses (hereinafter also called as distribution source apparatuses) having a function of distributing information (hereinafter also referred to as display information) to be displayed during surgery. Furthermore, the display apparatuses 5103A to 5103D can be apparatuses (hereinafter also called as output destination apparatuses) to which the display information is output. In addition, the recorder 5105 can be an apparatus fulfilling both of the distribution source apparatus and the output destination apparatus. The audio-visual controller 5107 controls working of the distribution source apparatuses and the output destination apparatuses and has a function of acquiring the display information from the distribution source apparatuses and transmitting the acquired display information to the output destination apparatuses to display or record the acquired display information on the output destination apparatuses. Note that the display information includes various images captured during surgery, various types of information regarding surgery (for example, body information of a patient, information about past examination results and surgical procedures, and the like), and the like.

Specifically, information about the image of the surgical site in the body cavity of the patient captured by an endoscope can be transmitted to the audio-visual controller 5107 from the apparatus group 5101 as the display information. Furthermore, information about the image of the area around the hands of the operating surgeon captured by the ceiling camera 5187 can be transmitted from this ceiling camera 5187 as the display information. In addition, information about the image indicating events in the entire surgery room captured by the surgical field camera 5189 can be transmitted from this surgical field camera 5189 as the display information. Note that, in a case where the surgery room system 5100 contains another apparatus having the imaging function, the audio-visual controller 5107 may acquire information about the image captured by the another apparatus also from the another apparatus as the display information.

Alternatively, for example, information about these images captured in the past is recorded in the recorder 5105 by the audio-visual controller 5107. The audio-visual controller 5107 can acquire information about these images captured in the past from the recorder 5105 as the display information. Note that also various types of information regarding surgery may be recorded in the recorder 5105 beforehand.

The audio-visual controller 5107 displays the acquired display information (in other words, images captured during surgery or various types of information regarding surgery) on at least one of the display apparatuses 5103A to 5103D, which are the output destination apparatuses. In the illustrated example, the display apparatus 5103A is a display apparatus installed by being suspended from the ceiling of the surgery room, the display apparatus 5103B is a display apparatus installed on the wall surface of the surgery room, the display apparatus 5103C is a display apparatus installed on a desk in the surgery room, and the display apparatus 5103D is a mobile instrument having a display function (for example, a tablet personal computer (PC)).

Furthermore, although illustration is omitted in FIG. 21, the surgery room system 5100 may include an apparatus outside the surgery room. Apparatuses outside the surgery room can be, for example, servers connected to a network constructed inside and outside the hospital, PCs used by medical staff, projectors installed in conference rooms of the hospital, and the like. In a case where such external apparatuses are located outside the hospital, the audio-visual controller 5107 can also display the display information on a display apparatus of another hospital via a television conference system or the like for remote medical treatment.

The surgery room control apparatus 5109 comprehensively controls processes other than processes relating to image display in the non-medical instruments. For example, the surgery room control apparatus 5109 controls driving of the patient bed 5183, the ceiling camera 5187, the surgical field camera 5189, and the illumination 5191.

A centralized operation panel 5111 is provided in the surgery room system 5100, and a user can give an instruction about image display to the audio-visual controller 5107 or can give an instruction about working of the non-medical instruments to the surgery room control apparatus 5109 via this centralized operation panel 5111. The centralized operation panel 5111 is configured in such a manner that a touch panel is provided on a display surface of the display apparatus.

Figure 22:
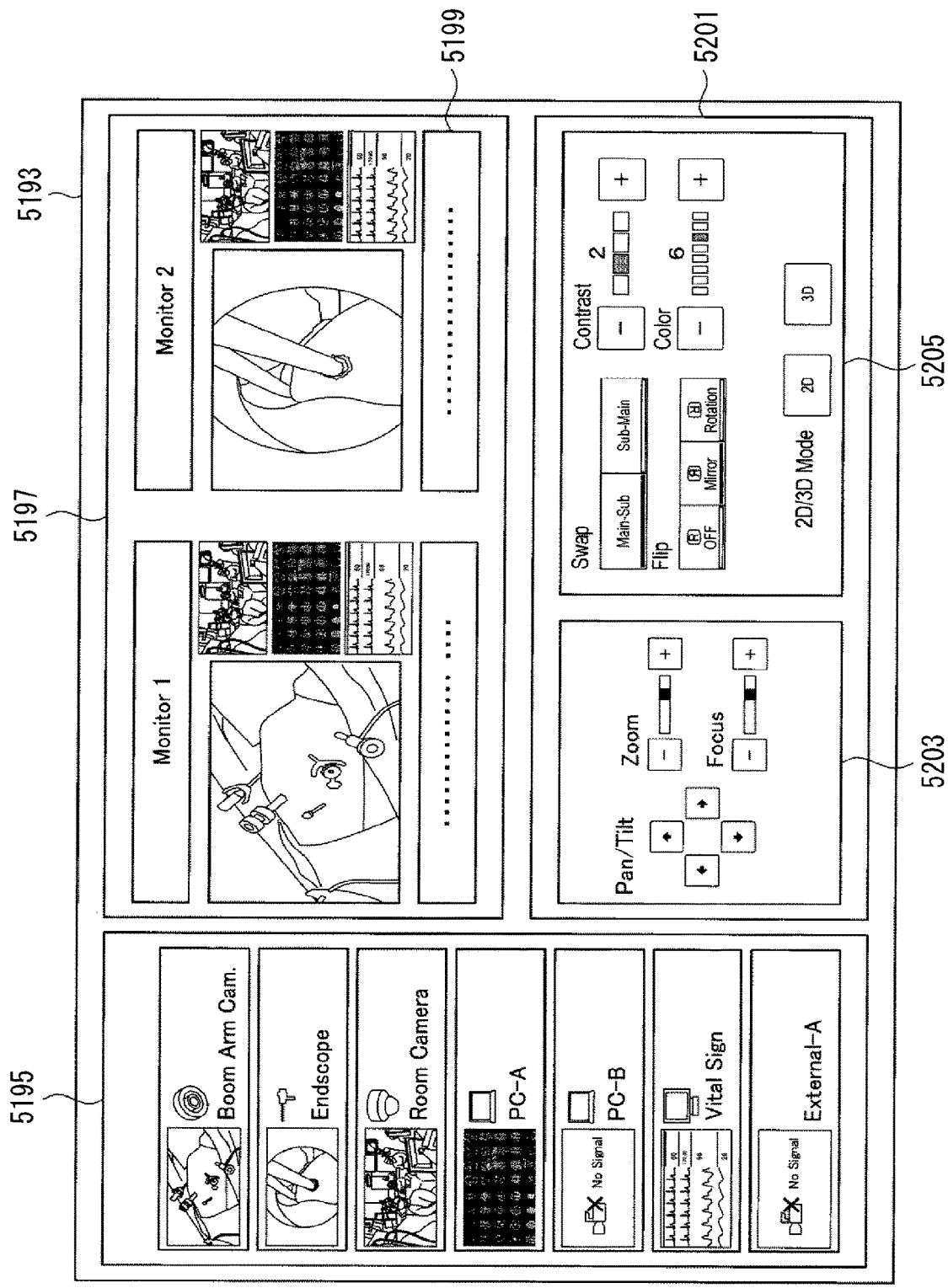
FIG. 22 is a diagram illustrating a display example of an operation screen on a centralized operation panel.

FIG. 22 is a diagram illustrating a display example of an operation screen on the centralized operation panel 5111. As an example, FIG. 22 illustrates an operation screen corresponding to a case where two display apparatuses are provided as the output destination apparatuses in the surgery room system 5100. Referring to FIG. 22, the operation screen 5193 is provided with a distribution source selection area 5195, a preview area 5197, and a control area 5201.

In the distribution source selection area 5195, distribution source apparatuses included in the surgery room system 5100 and thumbnail screens representing the display information kept by these distribution source apparatuses are linked and displayed. The user can select display information to be displayed on the display apparatus from any one of the distribution source apparatuses displayed in the distribution source selection area 5195.

In the preview area 5197, previews of screens displayed on the two display apparatuses (Monitor 1 and Monitor 2), which are the output destination apparatuses, are displayed. In the illustrated example, four images are displayed as a picture-in-picture (P-in-P) display on one display apparatus. These four images correspond to the display information distributed from the distribution source apparatus selected in the distribution source selection area 5195. Among the four images, one is displayed relatively large as a main image and the remaining three images are displayed relatively small as sub images. The user can interchange the main image with the sub images by appropriately selecting areas in which the four images are displayed. Furthermore, a status display area 5199 is provided under the areas in which the four images are displayed, and the status relating to the surgery (for example, the elapsed time of the surgery, the body information of the patient, and the like) can be appropriately displayed in this area.

The control area 5201 is provided with a distribution source operation area 5203 in which a graphical user interface (GUI) component for performing operations on the distribution source apparatus is displayed, and an output destination operation area 5205 in which a GUI component for performing operations on the output destination apparatus is displayed. In the illustrated example, GUI components for performing various operations (panning, tilting, and zooming) on a camera of the distribution source apparatus having the imaging function are provided in the distribution source operation area 5203. By appropriately selecting these GUI components, the user can operate working of the camera of the distribution source apparatus. Note that, although illustration is omitted, in a case where the distribution source apparatus being selected in the distribution source selection area 5195 is a recorder (in other words, in a case where an image recorded in the recorder in the past is displayed in the preview area 5197), GUI components for performing operations such as reproduction, reproduction stop, rewind, and fast forward of this past recorded image can be provided in the distribution source operation area 5203.

Furthermore, the output destination operation area 5205 is provided with GUI components for performing various operations (swap, flip, color adjustment, contrast adjustment, switching between two-dimensional (2D) display and three-dimensional (3D) display) with respect to display on the display apparatus, which is the output destination apparatus. By appropriately selecting these GUI components, the user can operate display on the display apparatus.

Note that the operation screen displayed on the centralized operation panel 5111 is not limited to the example illustrated in FIG. 22 and the user can be allowed to input, via the centralized operation panel 5111, operations to each apparatus that is included in the surgery room system 5100 and can be controlled by the audio-visual controller 5107 and the surgery room control apparatus 5109.

Figure 23:
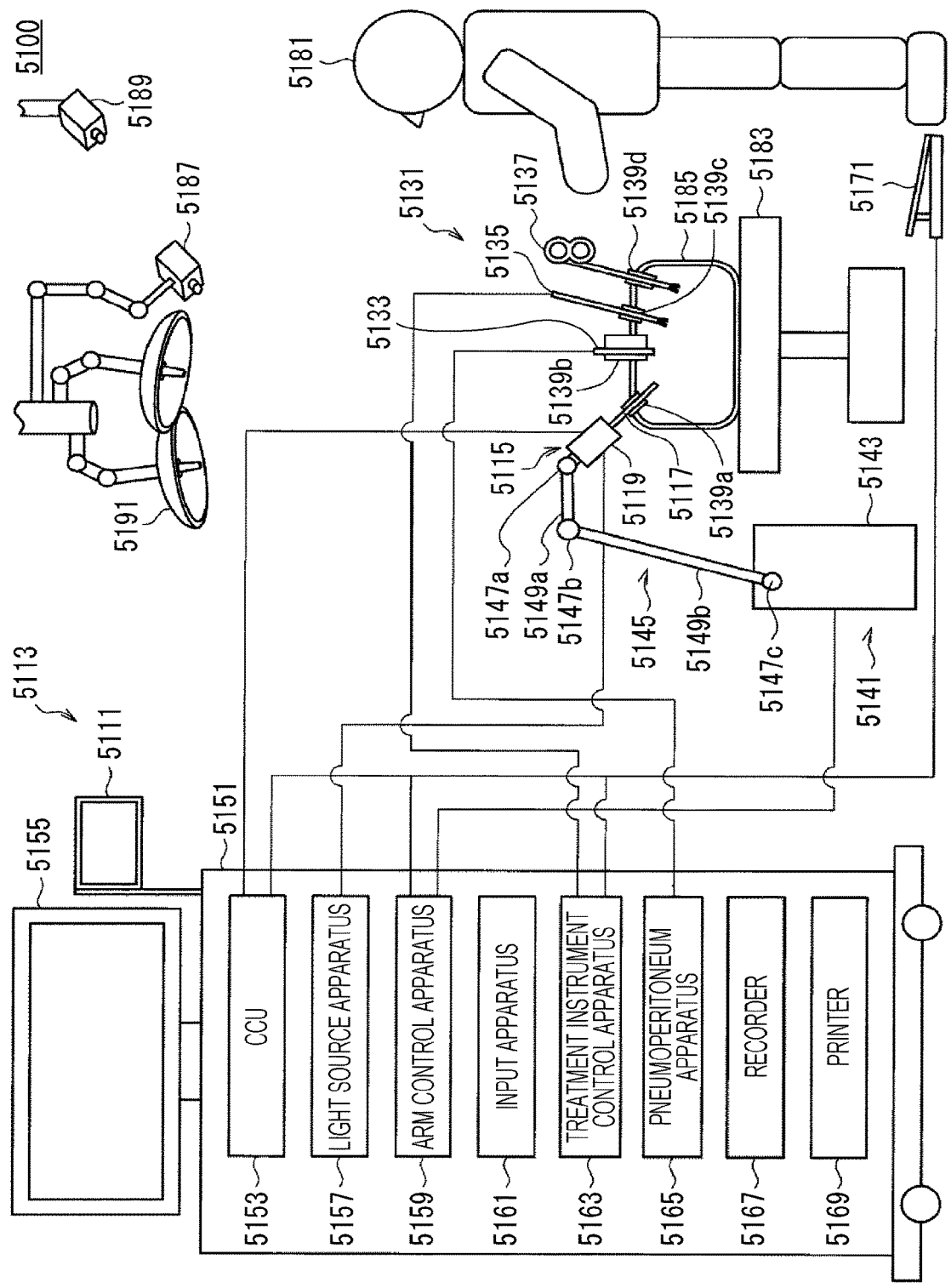
FIG. 23 is a diagram illustrating an example of how a surgery is conducted while the surgery room system is applied.

FIG. 23 is a diagram illustrating an example of how a surgery is conducted while the surgery room system described above is applied. The ceiling camera 5187 and the surgical field camera 5189 are provided on the ceiling of the surgery room and can capture the area around the hands of an operating surgeon (surgeon) 5181 performing the treatment on an affected part of a patient 5185 on the patient bed 5183, and events in the entire surgery room. The ceiling camera 5187 and the surgical field camera 5189 can be provided with a magnification adjustment function, a focal length adjustment function, a capturing direction adjustment function, and the like. The illumination 5191 is provided on the ceiling of the surgery room and irradiates at least the area around the hands of the operating surgeon 5181. The illumination 5191 can be capable of appropriately adjusting its irradiation light amount, wavelength (color) of the irradiation light, light irradiation direction, and the like.

As illustrated in FIG. 21, the endoscopic surgery system 5113, the patient bed 5183, the ceiling camera 5187, the surgical field camera 5189, and the illumination 5191 are connected to each other so as to be able to cooperate via the audio-visual controller 5107 and the surgery room control apparatus 5109 (not illustrated in FIG. 23). The centralized operation panel 5111 is provided in the surgery room and, as described above, the user can appropriately operate these apparatuses located in the surgery room via this centralized operation panel 5111.

Hereinafter, the configuration of the endoscopic surgery system 5113 will be described in detail. As illustrated in FIG. 23, the endoscopic surgery system 5113 is constituted by an endoscope 5115, other surgical tools 5131, a support arm apparatus 5141 supporting the endoscope 5115, and a cart 5151 in which various apparatuses for surgery through the endoscope are placed.

In endoscopic surgery, instead of cutting the abdominal wall and opening the abdomen, a plurality of cylindrical puncture tools called trocars 5139a to 5139d is punctured into the abdominal wall. Then, a lens barrel 5117 of the endoscope 5115 and other surgical tools 5131 are inserted into the body cavity of the patient 5185 through the trocars 5139a to 5139d. In the illustrated example, a pneumoperitoneum tube 5133, an energy treatment instrument 5135, and a forceps 5137 are inserted into the body cavity of the patient 5185 as the other surgical tools 5131. Furthermore, the energy treatment instrument 5135 is a treatment instrument that performs incision and detachment of tissue, sealing of a blood vessel, and the like by high-frequency current or ultrasonic vibration. However, the illustrated surgical tools 5131 are merely an example and various surgical tools generally used for surgery through the endoscope, such as a thumb forceps and a retractor, can be used as the surgical tools 5131.

The image of the surgical site in the body cavity of the patient 5185 captured by the endoscope 5115 is displayed on a display apparatus 5155. The operating surgeon 5181 performs treatment such as cutting off the affected part, for example, using the energy treatment instrument 5135 and the forceps 5137 while viewing the image of the surgical site displayed on the display apparatus 5155 in real time. Note that, although illustration is omitted, the pneumoperitoneum tube 5133, the energy treatment instrument 5135, and the forceps 5137 are supported by the operating surgeon 5181 or an assistant or the like during surgery.

Support Arm Apparatus

The support arm apparatus 5141 includes an arm portion 5145 extending from a base portion 5143. In the illustrated example, the arm portion 5145 is constituted by joint portions 5147a, 5147b, and 5147c, and links 5149a and 5149b and is driven under the control of an arm control apparatus 5159. The endoscope 5115 is supported by the arm portion 5145 such that the position and posture of the endoscope 5115 are controlled. With this configuration, fixing of the position of the endoscope 5115 can be implemented in a stable manner.

Endoscope

The endoscope 5115 is constituted by the lens barrel 5117 of which an area of a predetermined length from the distal end is inserted into the body cavity of the patient 5185, and a camera head 5119 connected to the proximal end of the lens barrel 5117. In the illustrated example, the endoscope 5115 configured as a so-called rigid endoscope having the rigid lens barrel 5117 is illustrated; however, the endoscope 5115 may be configured as a so-called flexible endoscope having the flexible lens barrel 5117.

An opening portion into which an objective lens is fitted is provided at the distal end of the lens barrel 5117. A light source apparatus 5157 is connected to the endoscope 5115; light generated by this light source apparatus 5157 is guided to the distal end of the lens barrel 5117 by a light guide provided extending inside this lens barrel, and is radiated toward an object to be observed in the body cavity of the patient 5185 via the objective lens. Note that the endoscope 5115 may be a forward-viewing endoscope, an oblique-viewing endoscope, or a side-viewing endoscope.

An optical system and an imaging element are provided inside the camera head 5119 and reflected light (observation light) from the object to be observed is converged on this imaging element by this optical system. The observation light is photoelectrically converted by the imaging element and an electrical signal corresponding to the observation light, in other words, an image signal corresponding to the observation image is generated. This image signal is transmitted as RAW data to a camera control unit (CCU) 5153. Note that the camera head 5119 is equipped with a function of adjusting the magnification and focal length by appropriately driving the optical system thereof.

In addition, for example, in order to cope with stereoscopic viewing (3D display) or the like, a plurality of imaging elements may be provided in the camera head 5119. In this case, a plurality of relay optical systems is provided inside the lens barrel 5117 in order to guide the observation light to each of the plurality of imaging elements.

Various Apparatuses Placed in Cart

The CCU 5153 is constituted by a central processing unit (CPU), graphics processing unit (GPU), or the like and comprehensively controls working of the endoscope 5115 and the display apparatus 5155. Specifically, the CCU 5153 carries out various image processes for displaying an image based on the image signal accepted from the camera head 5119, such as a developing process (demosaic process), for example, on this image. The CCU 5153 provides the image signal on which these image processes have been carried out to the display apparatus 5155. Furthermore, the audio-visual controller 5107 illustrated in FIG. 21 is connected to the CCU 5153. The CCU 5153 also provides the image signal on which the image processes have been carried out to the audio-visual controller 5107. In addition, the CCU 5153 transmits a control signal to the camera head 5119 and controls driving of the camera head 5119. This control signal can include information regarding imaging conditions such as magnification and focal length. This information regarding the imaging conditions may be input via an input apparatus 5161 or may be input via the above-described centralized operation panel 5111.

The display apparatus 5155 displays an image based on the image signal on which the image processes have been carried out by the CCU 5153, under the control of the CCU 5153. In a case where the endoscope 5115 is compatible with high resolution capturing such as 4K capturing (the number of horizontal pixels 3840×the number of vertical pixels 2160), or 8K capturing (the number of horizontal pixels 7680×the number of vertical pixels 4320), and/or is compatible with 3D display, for example, a display apparatus capable of high resolution display and/or capable of 3D display can be used as the display apparatus 5155 so as to cope with each case. In a case where the endoscope 5115 is compatible with high resolution capturing such as 4K or 8K capturing, a more immersive feeling can be obtained by using a display apparatus 5155 having a size of 55 inches or more. Furthermore, a plurality of display apparatuses 5155 with different resolutions and sizes may be provided depending on the practical usage.

The light source apparatus 5157 is constituted, for example, by a light source such as a light emitting diode (LED) and supplies irradiation light used when the surgical site is captured to the endoscope 5115.

The arm control apparatus 5159 is constituted, for example, by a processor such as a CPU and works in accordance with a predetermined program to control driving of the arm portion 5145 of the support arm apparatus 5141 in accordance with a predetermined control scheme.

The input apparatus 5161 is an input interface to the endoscopic surgery system 5113. The user can input various types of information and input instructions to the endoscopic surgery system 5113 via the input apparatus 5161. For example, the user inputs various types of information regarding surgery, such as body information of the patient and information about the surgical procedure of the surgery, via the input apparatus 5161. Furthermore, for example, the user inputs an instruction to drive the arm portion 5145, an instruction to change the imaging conditions (the type of irradiation light, the magnification, the focal length, and the like) for the endoscope 5115, an instruction to drive the energy treatment instrument 5135, and the like via the input apparatus 5161.

The type of the input apparatus 5161 is not limited and the input apparatus 5161 can be various known input apparatuses. For example, a mouse, a keyboard, a touch panel, a switch, a foot switch 5171, a lever, and/or the like, can be applied as the input apparatus 5161. In a case where a touch panel is used as the input apparatus 5161, the touch panel may be provided on the display surface of the display apparatus 5155.

Alternatively, the input apparatus 5161 is a device worn by the user, such as a glasses-type wearable device or a head mounted display (HMD), for example, and various inputs are made according to the gesture and the line of sight of the user detected by these devices. Furthermore, the input apparatus 5161 includes a camera capable of detecting the motion of the user and various inputs are made according to the gesture and the line of sight of the user detected from a video captured by the camera. Moreover, the input apparatus 5161 includes a microphone capable of picking up the voice of the user and various inputs are made by sound via the microphone. In this manner, by configuring the input apparatus 5161 so as to be able to input various types of information in a non-contact manner, particularly a user (for example, the operating surgeon 5181) belonging to a clean area is allowed to operate an instrument belonging to a non-clean area in a non-contact manner. In addition, since the user can operate the instrument without releasing his/her hand from the holding surgical tool, the user's convenience is improved.

A treatment instrument control apparatus 5163 controls driving of the energy treatment instrument 5135 for cauterization and incision of tissue, or sealing of a blood vessel, or the like. For the purpose of securing a visual field of the endoscope 5115 and securing a working space for the operating surgeon, a pneumoperitoneum apparatus 5165 delivers a gas into the body cavity of the patient 5185 via the pneumoperitoneum tube 5133 in order to inflate the body cavity. A recorder 5167 is an apparatus capable of recording various types of information regarding surgery. A printer 5169 is an apparatus capable of printing various types of information regarding surgery in various formats such as text, image, or graph.

Hereinafter, a particularly characteristic configuration of the endoscopic surgery system 5113 will be described in more detail.

Support Arm Apparatus

The support arm apparatus 5141 includes the base portion 5143 as a pedestal and the arm portion 5145 extending from the base portion 5143. In the illustrated example, the arm portion 5145 is constituted by the plurality of joint portions 5147a, 5147b, and 5147c, and the plurality of links 5149a and 5149b coupled by the joint portion 5147b; in FIG. 23, however, for the sake of simplicity, the configuration of the arm portion 5145 is illustrated in a simplified manner. Actually, the shapes, the number, and the arrangement of the joint portions 5147a to 5147c and the links 5149a and 5149b, as well as the directions of the rotation axes of the joint portions 5147a to 5147c, and the like can be appropriately set such that the arm portion 5145 has a desired degree of freedom. For example, the arm portion 5145 can be suitably configured so as to have degrees of freedom equal to or greater than six degrees of freedom. This allows the endoscope 5115 to freely move within the movable range of the arm portion 5145, such that the lens barrel 5117 of the endoscope 5115 can be inserted into the body cavity of the patient 5185 in a desired direction.

Actuators are provided in the joint portions 5147a to 5147c and the joint portions 5147a to 5147c are configured so as to be rotatable around predetermined rotation axes by driving of these actuators. Driving of the actuators is controlled by the arm control apparatus 5159, such that the rotation angle of each of the joint portions 5147a to 5147c is controlled and then driving of the arm portion 5145 is controlled. With this configuration, the control of the position and posture of the endoscope 5115 can be implemented. At this time, the arm control apparatus 5159 can control driving of the arm portion 5145 by various known control schemes such as force control or position control.

For example, the position and posture of the endoscope 5115 can be controlled in such a manner that the operating surgeon 5181 appropriately makes an operation input via the input apparatus 5161 (including the foot switch 5171) and in turn the arm control apparatus 5159 appropriately controls driving of the arm portion 5145 according to the operation input. With this control, the endoscope 5115 at the distal end of the arm portion 5145 can be moved from an arbitrary position to another arbitrary position and thereafter can be fixedly supported at that position after the movement. Note that the arm portion 5145 may be operated by a so-called master slave scheme. In this case, the arm portion 5145 can be remotely operated by the user via the input apparatus 5161 installed at a place away from the surgery room.

Furthermore, in a case where the force control is applied, the arm control apparatus 5159 may perform so-called power assist control in which the actuators of the respective joint portions 5147a to 5147c are driven in response to an external force from the user such that the arm portion 5145 moves smoothly in proportion to the external force. With this control, when the user moves the arm portion 5145 while directly touching the arm portion 5145, the arm portion 5145 can be moved with a relatively light force. Accordingly, it becomes possible to more intuitively move the endoscope 5115 with a simpler operation and user's convenience can be improved.

Here, in general surgery through the endoscope, the endoscope 5115 has been supported by a surgeon called a scopist. In contrast to this, using the support arm apparatus 5141 makes it possible to reliably fix the position of the endoscope 5115 without manual operation, such that the image of the surgical site can be stably obtained and surgery can be performed smoothly.

Note that the arm control apparatus 5159 is not necessarily provided in the cart 5151. Furthermore, the arm control apparatus 5159 is not necessarily one apparatus. For example, the arm control apparatus 5159 may be provided in each of the joint portions 5147a to 5147c of the arm portion 5145 of the support arm apparatus 5141 such that control of driving of the arm portion 5145 is implemented by the plurality of arm control apparatuses 5159 collaborating with each other.

Light Source Apparatus

The light source apparatus 5157 supplies the endoscope 5115 with irradiation light when the surgical site is captured. The light source apparatus 5157 is constituted by, for example, an LED, a laser light source, or a white light source constituted by a combination thereof. At this time, in a case where the white light source is configured by a combination of RGB laser light sources, the output intensity and the output timing of each color (each wavelength) can be controlled with high precision and accordingly the white balance of the captured image can be adjusted in the light source apparatus 5157. Furthermore, in this case, by irradiating an object to be observed with a laser beam from each of the RGB laser light sources by time sharing and controlling driving of the imaging element of the camera head 5119 in synchronization with the irradiation timing, it is also possible to capture an image correspond to each of RGB by time sharing. According to this method, a color image can be obtained without providing a color filter in the imaging element.

In addition, driving of the light source apparatus 5157 may be controlled such that the intensity of light to be output is changed for every predetermined time span. By controlling driving of the imaging element of the camera head 5119 in synchronism with the timing of the change of the intensity of light to acquire images by time sharing and merging these images, an image of a high dynamic range without so-called blocked up shadows and blown out highlights can be generated.

Furthermore, the light source apparatus 5157 may be configured such that light of a predetermined wavelength band compatible with special light observation can be supplied from the light source apparatus 5157. In the special light observation, for example, by utilizing the wavelength dependence of light absorption in body tissue, so-called narrow band light observation (narrow band imaging) is performed in which, by radiating narrow band light compared with the irradiation light at the time of ordinary observation (in other words, white light), predetermined tissue such as a blood vessel at a mucosal surface layer is captured with high contrast. Alternatively, in the special light observation, fluorescence observation for obtaining an image by fluorescence produced by radiating excitation light may be performed. In the fluorescence observation, for example, fluorescence observation in which body tissue is irradiated with excitation light and fluorescence from the body tissue is observed (autofluorescence observation), or fluorescence observation in which a reagent such as indocyanine green (ICG) is locally administered to body tissue and at the same time, the body tissue is irradiated with excitation light corresponding to a fluorescence wavelength of the reagent to obtain a fluorescent image can be performed. The light source apparatus 5157 can be configured such that narrow band light and/or excitation light compatible with such special light observation can be supplied from the light source apparatus 5157.

Camera Head and CCU

Figure 24:
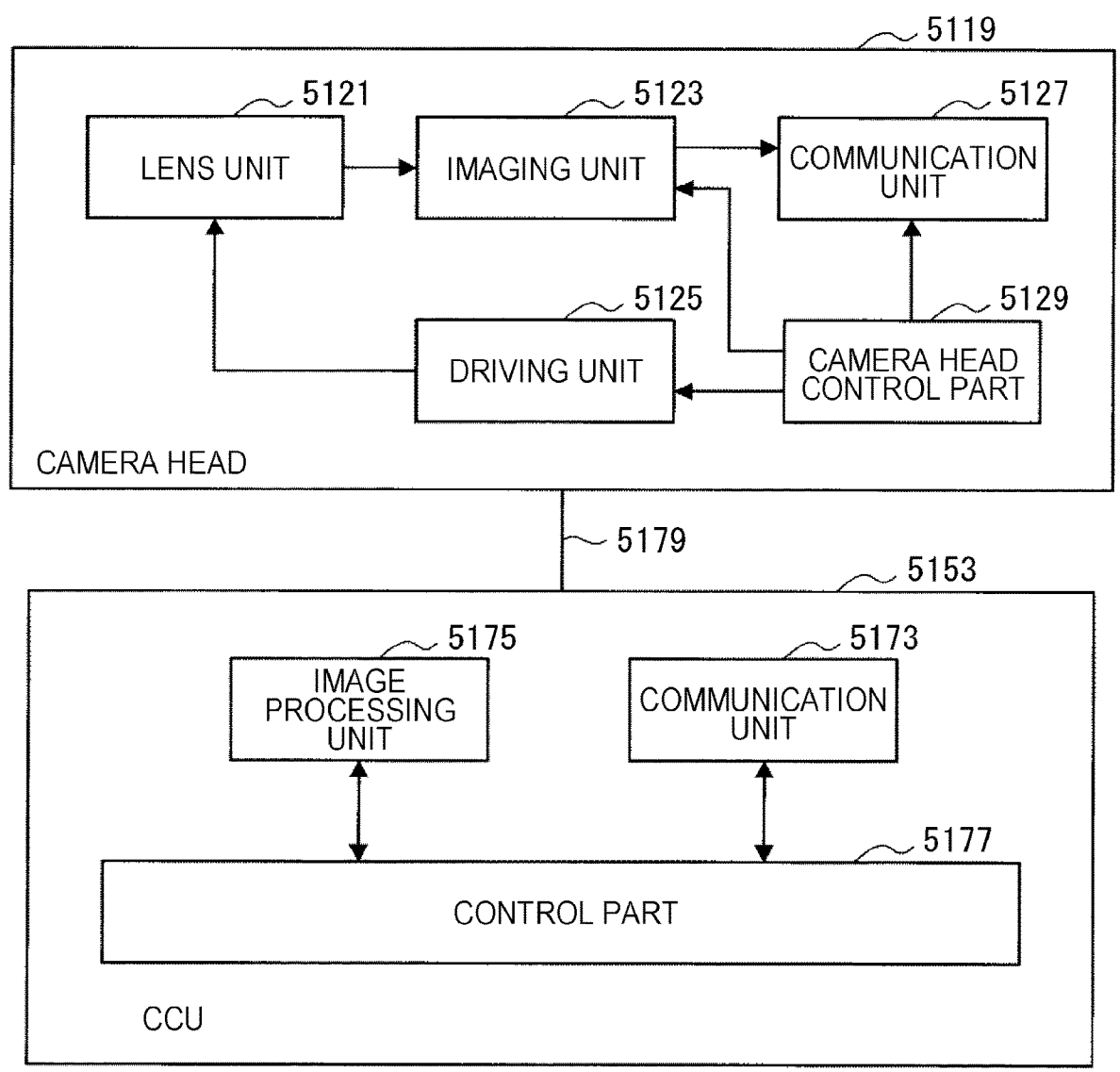
FIG. 24 is a block diagram illustrating an example of functional configurations of a camera head and a camera control unit (CCU) illustrated in FIG. 23.

Referring to FIG. 24, functions of the camera head 5119 and the CCU 5153 of the endoscope 5115 will be described in more detail. FIG. 24 is a block diagram illustrating an example of functional configurations of the camera head 5119 and the CCU 5153 illustrated in FIG. 23.

Referring to FIG. 24, the camera head 5119 has a lens unit 5121, an imaging unit 5123, a driving unit 5125, a communication unit 5127, and a camera head control part 5129 as functions thereof. Furthermore, the CCU 5153 has a communication unit 5173, an image processing unit 5175, and a control part 5177 as functions thereof. The camera head 5119 and the CCU 5153 are connected via a transmission cable 5179 so as to be able to communicate bidirectionally.

First, the functional configuration of the camera head 5119 will be described. The lens unit 5121 is an optical system provided at a connecting portion with the lens barrel 5117. The observation light taken in from the distal end of the lens barrel 5117 is guided to the camera head 5119 and is incident on the lens unit 5121. The lens unit 5121 is constituted by combining a plurality of lenses including a zoom lens and a focus lens. The optical characteristics of the lens unit 5121 are adjusted so as to converge the observation light on a light receiving surface of the imaging element of the imaging unit 5123. Furthermore, the zoom lens and the focus lens are configured such that their positions on an optical axis can move in order to adjust the magnification and focus of the captured image.

The imaging unit 5123 is constituted by the imaging element and is arranged at a subsequent stage of the lens unit 5121. The observation light having passed through the lens unit 5121 is converged on the light receiving surface of the imaging element and an image signal corresponding to the observation image is generated by photoelectric conversion. The image signal generated by the imaging unit 5123 is provided to the communication unit 5127.

For example, an image sensor of the complementary metal oxide semiconductor (CMOS) type capable of capturing a color image having a Bayer array is used as the imaging element constituting the imaging unit 5123. Note that, for example, an imaging element capable of coping with capturing of a high resolution image of 4K or more may be used as the imaging element. Since the image of the surgical site is obtained with high resolution, the operating surgeon 5181 can grasp how the surgical site is in more detail and can progress the surgery more smoothly.

Furthermore, the imaging element constituting the imaging unit 5123 is configured such that the imaging element constituting the imaging unit 5123 has a pair of imaging elements for separately acquiring image signals for right eye and left eye compatible with the 3D display. Owing to that the 3D display is performed, the operating surgeon 5181 can more accurately grasp the depth of the living tissue in the surgical site. Note that, in a case where the imaging unit 5123 is configured as a multi-plate type, the lens units 5121 are also provided as a plurality of systems corresponding to respective imaging elements.

Furthermore, the imaging unit 5123 is not necessarily provided in the camera head 5119. For example, the imaging unit 5123 may be provided inside the lens barrel 5117 immediately behind the objective lens.

The driving unit 5125 is constituted by an actuator and moves the zoom lens and the focus lens of the lens unit 5121 by a predetermined distance along the optical axis under the control of the camera head control part 5129. With this movement, the magnification and the focus of the captured image by the imaging unit 5123 can be appropriately adjusted.

The communication unit 5127 is constituted by a communication apparatus for transmitting and receiving various types of information to and from the CCU 5153. The communication unit 5127 transmits the image signal obtained from the imaging unit 5123 as RAW data to the CCU 5153 via the transmission cable 5179. At this time, in order to display the captured image of the surgical site with low latency, it is preferred that the image signal be transmitted by optical communication. This is because the operating surgeon 5181 performs surgery while observing the state of the affected part with the captured image and thus, for more safe and reliable surgery, the moving image of the surgical site is required to be displayed in real time as much as possible during surgery. In a case where optical communication is performed, a photoelectric conversion module that converts the electrical signal into an optical signal is provided in the communication unit 5127. The image signal is converted into an optical signal by the photoelectric conversion module and then transmitted to the CCU 5153 via the transmission cable 5179.

Furthermore, the communication unit 5127 receives the control signal for controlling driving of the camera head 5119 from the CCU 5153. This control signal may include information regarding imaging conditions, such as information to specify a frame rate of the captured image, information to specify an exposure value at the time of imaging, and/or information to specify the magnification and focus of the captured image, for example. The communication unit 5127 provides the received control signal to the camera head control part 5129. Note that the control signal from the CCU 5153 may also be transmitted by optical communication. In this case, the communication unit 5127 is provided with a photoelectric conversion module that converts the optical signal into an electrical signal; the control signal is converted into an electrical signal by this photoelectric conversion module and then provided to the camera head control part 5129.

Note that the above-mentioned imaging conditions such as the frame rate, exposure value, magnification, and focus are automatically set by the control part 5177 of the CCU 5153 on the basis of the acquired image signal. That is, so-called auto exposure (AE) function, auto focus (AF) function, and auto white balance (AWB) function are equipped in the endoscope 5115.

The camera head control part 5129 controls driving of the camera head 5119 on the basis of the control signal received from the CCU 5153 via the communication unit 5127. For example, the camera head control part 5129 controls driving of the imaging element of the imaging unit 5123 on the basis of information to specify the frame rate of the captured image and/or information to specify exposure at the time of imaging. Furthermore, for example, the camera head control part 5129 appropriately moves the zoom lens and the focus lens of the lens unit 5121 via the driving unit 5125 on the basis of information to specify the magnification and focus of the captured image. The camera head control part 5129 may further include a function of storing information for identifying the lens barrel 5117 and the camera head 5119.

Note that, by arranging constituents such as the lens unit 5121 and the imaging unit 5123 in a hermetically sealed structure having high airtightness and waterproofness, the camera head 5119 is enabled to have resistance to an autoclave sterilization process.

Next, the functional configuration of the CCU 5153 will be described. The communication unit 5173 is constituted by a communication apparatus for transmitting and receiving various types of information to and from the camera head 5119. The communication unit 5173 receives the image signal transmitted from the camera head 5119 via the transmission cable 5179. At this time, as described above, the image signal can be suitably transmitted by optical communication. In this case, a photoelectric conversion module that converts the optical signal into an electrical signal is provided in the communication unit 5173 so as to be compatible with the optical communication. The communication unit 5173 provides the image signal converted into the electrical signal to the image processing unit 5175.

Furthermore, the communication unit 5173 transmits the control signal for controlling driving of the camera head 5119 to the camera head 5119. This control signal can also be transmitted by optical communication.

The image processing unit 5175 carries out various image processes on the image signal, which is RAW data transmitted from the camera head 5119. Examples of these image processes include various known signal processes such as a developing process, a high image quality process (a band enhancement process, a super resolution process, a noise reduction (NR) process, a camera shake correction process, and/or the like), and/or an enlargement process (electronic zoom process). Furthermore, the image processing unit 5175 performs a wave sensing process on the image signal for performing AE, AF, and AWB.

The image processing unit 5175 is constituted by a processor such as a CPU and a GPU and the above-described image processes and wave sensing process can be performed by this processor working in accordance with a predetermined program. Note that, in a case where the image processing unit 5175 is constituted by a plurality of GPUs, the image processing unit 5175 appropriately divides the information associated with the image signal and performs the image processes in parallel by the plurality of GPUs.

The control part 5177 performs various types of control relating to imaging of the surgical site by the endoscope 5115 and display of the captured image obtained by the imaging. For example, the control part 5177 generates a control signal for controlling driving of the camera head 5119. At this time, in a case where the imaging conditions have been input by the user, the control part 5177 generates the control signal on the basis of the input by the user. Alternatively, in a case where the AE function, the AF function, and the AWB function are equipped in the endoscope 5115, the control part 5177 appropriately calculates the optimum exposure value, focal length, and white balance according to the result of the wave sensing process by the image processing unit 5175 and generates the control signal.

Furthermore, the control part 5177 displays the image of the surgical site on the display apparatus 5155 on the basis of the image signal on which the image processes have been carried out by the image processing unit 5175. At this time, the control part 5177 recognizes various objects in the image of the surgical site using various image recognition technologies. For example, the control part 5177 detects the shape, color, and the like of the edge of an object included in the image of the surgical site, thereby being able to recognize a surgical tool such as the forceps, a particular living body part, bleeding, a mist at the time of using the energy treatment instrument 5135, and the like. When displaying the image of the surgical site on the display apparatus 5155, the control part 5177 displays various types of surgery support information superimposed onto this image of the surgical site using results of the recognition. Since the surgery support information is displayed superimposed and presented to the operating surgeon 5181, surgery can be advanced more safely and reliably.

The transmission cable 5179 connecting the camera head 5119 and the CCU 5153 is an electrical signal cable compatible with communication of electrical signals, an optical fiber compatible with optical communication, or a composite cable thereof.

Here, in the illustrated example, communication is performed by wire using the transmission cable 5179; however, communication between the camera head 5119 and the CCU 5153 may be performed wirelessly. In a case where the communication between the camera head 5119 and the CCU 5153 is performed wirelessly, it is no longer necessary to lay the transmission cable 5179 in the surgery room, such that the situation in which the movement of the medical staff in the surgery room is hindered by the transmission cable 5179 can be solved.

An example of the surgery room system 5100 to which the technology according to the present disclosure can be applied has been described thus far. Note that, as an example, a case where a medical system to which the surgery room system 5100 is applied is the endoscopic surgery system 5113 has been described here; however, the configuration of the surgery room system 5100 is not limited to this example. For example, the surgery room system 5100 may be applied to a flexible endoscope system for examination or a microscope surgery system instead of the endoscopic surgery system 5113.

The technology according to the present disclosure can be suitably applied to the audio-visual controller 5107 in the configuration described above. Specifically, the configuration of the control apparatus of the present technology can be applied to the audio-visual controller 5107 that controls the working of the distribution source apparatus and the output destination apparatus. By applying the technology according to the present disclosure to the audio-visual controller 5107, stable streaming can be provided according to the state of the network; consequently, the precision of diagnosis can be improved particularly in remote medical treatment performed in real time.

Furthermore, the embodiments according to the present technology are not limited to the aforementioned embodiments and various modifications can be made without departing from the scope of the present technology.

Moreover, the present technology can also be configured as described below.

(1)

A communication system including:

a reception apparatus;

a transmission apparatus that performs streaming to the reception apparatus; and a control apparatus that manages a state of a network that connects the reception apparatus and the transmission apparatus and includes a first communication line and a second communication line, in which the first communication line is unstable in connection state as compared with the second communication line, and the control apparatus manages a state of the network on the basis of a packet transmitted from the transmission apparatus to the reception apparatus.

(2)

The communication system according to (1), in which the first communication line has large delay or packet loss as compared with the second communication line.

(3)

The communication system according to (2), in which the first communication line includes a wireless communication line, and the second communication line is configured only from a wired communication line.

(4)

The communication system according to (3), in which the transmission apparatus is connected to the network by the first communication line, and the reception apparatus is connected to the network by the second communication line.

(5)

The communication system according to (4), in which the transmission apparatus performs the streaming by a user datagram protocol (UDP) to the reception apparatus.

(6)

The communication system according to (5), in which the control apparatus includes:

a state grasping unit that grasps a reception state of the streaming in the reception apparatus through a transmission control protocol (TCP) connection; and a designation unit that designates to stop the streaming on the basis of the reception state of the streaming.

(7)

The communication system according to (6), in which the designation unit designates to stop the streaming on the basis of at least one of a packet reception interval or a packet loss amount within a predetermined time in the reception apparatus.

(8)

The communication system according to (6) or (7), in which the transmission apparatus performs the streaming by bonding using a plurality of the first communication lines, the state grasping unit grasps a reception state of the streaming via each of the plurality of the first communication lines in the reception apparatus, and the designation unit designates to stop the streaming on the basis of each of the reception states of the streaming.

(9)

The communication system according to (8), in which the designation unit designates to stop the streaming on the basis of each of the reception states of the streaming and a communication scheme in each of the plurality of the first communication lines.

(10)

The communication system according to (5), in which the reception apparatus includes a bandwidth estimation unit that estimates a bandwidth of the network where the streaming is performed, and the control apparatus includes a parameter setting unit that sets a parameter relating to the streaming performed by the transmission apparatus on the basis of the estimated bandwidth of the network.

(11)

The communication system according to (10), in which the transmission apparatus transmits a packet to the reception apparatus while increasing a transmission rate stepwise every predetermined time, and the bandwidth estimation unit estimates a bandwidth of the network on the basis of a reception rate of a packet received from the transmission apparatus.

(12)

The communication system according to (10) or (11), in which the reception apparatus further includes a congestion locating unit that locates congestion in the network, and the bandwidth estimation unit estimates a bandwidth of the network on the basis of a locating result for congestion in the network.

(13)

The communication system according to (12), in which the congestion locating unit locates congestion in the network on the basis of a relative delay amount of a real-time transport protocol (RTP) packet.

(14)

The communication system according to any one of (1) to (13), in which the transmission apparatus performs streaming of a moving image.

(15)

The communication system according to (14), in which the transmission apparatus is configured as an imaging apparatus that captures a moving image and transmits the captured moving image in real time.

(16)

A control apparatus including a control part that manages a state of a network that connects a reception apparatus and a transmission apparatus that performs streaming to the reception apparatus, and includes a first communication line and a second communication line, in which the first communication line is unstable in connection state as compared with the second communication line, and the control part manages a state of the network on the basis of a packet transmitted from the transmission apparatus to the reception apparatus.

REFERENCE SIGNS LIST

1 Communication system
11 Transmission apparatus
12 Reception apparatus
13 Control apparatus
20, 20-1, 20-2 Base station
30 Internet
91 State designation unit
101 Control part
111 State grasping unit
112 Working designation unit
121 Bandwidth estimation unit
122 Congestion locating unit
131 Control part
141 Parameter setting unit
151 Control part

The invention claimed is:

1. A communication system comprising:
a reception apparatus;
a transmission apparatus that performs streaming to the reception apparatus; and
circuitry configured to manage a state of a network that connects the reception apparatus to the transmission apparatus, the network including a first communication line that connects the transmission apparatus to the Internet and a second communication line that connects the reception apparatus to the Internet, the circuitry being connected to the Internet via a communication line that is separate from the first and second communication lines, wherein the first communication line is unstable in a connection state as compared with the second communication line, and the circuitry communicating with both the reception apparatus and the transmission apparatus via the network in order to manage a state of the network.

2. The communication system according to claim 1, wherein the first communication line has a delay or packet loss as compared with the second communication line.

3. The communication system according to claim 2, wherein the first communication line includes a wireless communication line, and the second communication line is configured only from a wired communication line.

4. The communication system according to claim 3, wherein the transmission apparatus performs the streaming by a user datagram protocol (UDP) to the reception apparatus.

5. The communication system according to claim 4, wherein the circuitry is further configured to:
grasp a reception state of the streaming in the reception apparatus through a transmission control protocol (TCP) connection; and
designate to stop the streaming on a basis of the reception state of the streaming.

6. The communication system according to claim 5, wherein the circuitry designates to stop the streaming on a basis of at least one of a packet reception interval or a packet loss amount within a predetermined time in the reception apparatus.

7. The communication system according to claim 5, wherein the transmission apparatus performs the streaming by bonding using a plurality of the first communication lines, the circuitry grasps a reception state of the streaming via each of the plurality of the first communication lines in the reception apparatus, and the circuitry designates to stop the streaming on a basis of each of the reception states of the streaming.

8. The communication system according to claim 7, wherein the circuitry designates to stop the streaming on a basis of each of the reception states of the streaming and a communication scheme in each of the plurality of the first communication lines.

9. The communication system according to claim 4, wherein the reception apparatus includes a bandwidth estimation circuit that estimates a bandwidth of the network where the streaming is performed, and the circuitry sets a parameter relating to the streaming performed by the transmission apparatus on a basis of the estimated bandwidth of the network.

10. The communication system according to claim 9, wherein the transmission apparatus transmits a packet to the reception apparatus while increasing a transmission rate stepwise every predetermined time, and the bandwidth estimation circuit estimates a bandwidth of the network on a basis of a reception rate of a packet received from the transmission apparatus.

11. The communication system according to claim 9, wherein the reception apparatus further locates congestion in the network, and the bandwidth estimation circuit estimates a bandwidth of the network on a basis of a locating result for congestion in the network.

12. The communication system according to claim 11, wherein the reception apparatus locates congestion in the network on a basis of a delay amount of a real-time transport protocol (RTP) packet.

13. The communication system according to claim 1, wherein the transmission apparatus performs streaming of a moving image.

14. The communication system according to claim 13, wherein the transmission apparatus is configured as an imaging apparatus that captures a moving image and transmits the captured moving image in real time.

15. A control apparatus comprising:
circuitry configured to
manage a state of a network that connects a reception apparatus to a transmission apparatus that performs streaming to the reception apparatus, the network including a first communication line that connects the transmission apparatus to the Internet and a second communication line that connects the transmission apparatus to the Internet, the control apparatus being connected to the Internet via a communication line that is separate from the first and second transmission lines, wherein the first communication line is unstable in a connection state as compared with the second communication line, and
the circuitry communicating with both the reception apparatus and the transmission apparatus via the network in order to manage a state of the network.

* * * * *